United States Patent
Wicks et al.

(10) Patent No.: US 12,297,732 B2
(45) Date of Patent: May 13, 2025

(54) DRILLING CONTROL

(71) Applicant: Schlumberger Technology Corporation, Sugar Land, TX (US)

(72) Inventors: Nathaniel Wicks, Katy, TX (US); Yingwei Yu, Katy, TX (US); Richard John Meehan, Houston, TX (US); Darine Mansour, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 600 days.

(21) Appl. No.: 17/304,151

(22) Filed: Jun. 15, 2021

(65) Prior Publication Data

US 2022/0397029 A1    Dec. 15, 2022

(51) Int. Cl.
| | | |
|---|---|---|
| *E21B 44/04* | (2006.01) | |
| *E21B 45/00* | (2006.01) | |
| *G06N 3/044* | (2023.01) | |
| *G06N 3/088* | (2023.01) | |

(52) U.S. Cl.
CPC .............. *E21B 44/04* (2013.01); *E21B 45/00* (2013.01); *G06N 3/044* (2023.01); *G06N 3/088* (2013.01); *E21B 2200/22* (2020.05)

(58) Field of Classification Search
CPC ...... E21B 44/04; E21B 45/00; E21B 2200/22; E21B 44/00; G06N 3/044; G06N 3/088; G06N 3/006; G06N 3/0442; G06N 3/0464; G06N 3/084; G06N 3/092
See application file for complete search history.

(56) References Cited

U.S. PATENT DOCUMENTS

| | | | |
|---|---|---|---|
| 7,775,297 B2 | 8/2010 | Hopwood et al. | |
| 8,136,609 B2 | 3/2012 | Hopwood et al. | |
| 10,400,573 B2 | 9/2019 | Yang et al. | |
| 10,900,342 B2 | 1/2021 | Belaskie et al. | |
| 11,280,173 B1* | 3/2022 | Buerger | E21B 44/00 |
| 11,441,411 B2* | 9/2022 | Venugopal | E21B 41/00 |
| 2002/0120401 A1 | 8/2002 | Macdonald et al. | |
| 2015/0081222 A1 | 3/2015 | Laing et al. | |
| 2019/0169986 A1 | 6/2019 | Storm, Jr. et al. | |
| 2020/0182038 A1 | 6/2020 | Soukup et al. | |
| 2020/0190957 A1 | 6/2020 | Madasu et al. | |
| 2020/0370409 A1 | 11/2020 | Yu et al. | |
| 2021/0019528 A1* | 1/2021 | Ghadyali | G06F 11/3409 |

(Continued)

FOREIGN PATENT DOCUMENTS

| | | | | |
|---|---|---|---|---|
| WO | WO-2015123591 A1 * | 8/2015 | ......... | E21B 41/0007 |
| WO | WO-2020046351 A1 * | 3/2020 | ............ | E21B 21/06 |
| WO | 2021097414 | | 5/2021 | |

OTHER PUBLICATIONS

Search Report and Written Opinion of International Patent Application No. PCT/US2022/033554 dated Sep. 23, 2022, 9 pages.

(Continued)

*Primary Examiner* — Charles R Kasenge
(74) *Attorney, Agent, or Firm* — Jeffrey D. Frantz

(57) ABSTRACT

A method can include receiving sensor data; determining a rate of penetration drilling parameter value using a trained neural network and at least a portion of the sensor data; and issuing a control instruction for drilling a borehole using the determined rate of penetration drilling parameter value.

14 Claims, 29 Drawing Sheets

(56) References Cited

U.S. PATENT DOCUMENTS

2021/0115779 A1     4/2021   Hopwood et al.
2021/0131258 A1     5/2021   Wicks et al.
2021/0166115 A1     6/2021   Yu et al.

OTHER PUBLICATIONS

V. Mnih et al. (2015), Human-level control through deep reinforcement learning, Nature vol. 518: pp. 529.

Y. Yu et al. (2021), Training an Automated Directional Drilling Agent with Deep Reinforcement Learning in a Simulated Environment, to appear SPE-IADC 2021, SPE-204105-MS.

Y. Yu et al. (2019b), Using Deep Kalman Filter to Predict Drilling Time Series, International Petroleum Technology Conference 2019, IPTC-19207-MS.

Kalman, R. E., (1960). "A New Approach to Linear Filtering and Prediction Problems". Journal of Basic Engineering. 82: 35. doi:10.1115/1.3662552.

\* cited by examiner

System 1300

System 2300
GUI 2301

DRILLING CONTROL

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore (e.g., a borehole) may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.).

SUMMARY

A method can include receiving sensor data; determining a rate of penetration drilling parameter value using a trained neural network and at least a portion of the sensor data; and issuing a control instruction for drilling a borehole using the determined rate of penetration drilling parameter value. A system can include a processor; memory accessible to the processor; processor-executable instructions stored in the memory and executable by the processor to instruct the system to: receive sensor data; determine a rate of penetration drilling parameter value using a trained neural network and at least a portion of the sensor data; and issue a control instruction for drilling a borehole using the determined rate of penetration drilling parameter value. One or more computer-readable storage media can include computer-executable instructions executable to instruct a computing system to: receive sensor data; determine a rate of penetration drilling parameter value using a trained neural network and at least a portion of the sensor data; and issue a control instruction for drilling a borehole using the determined rate of penetration drilling parameter value. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
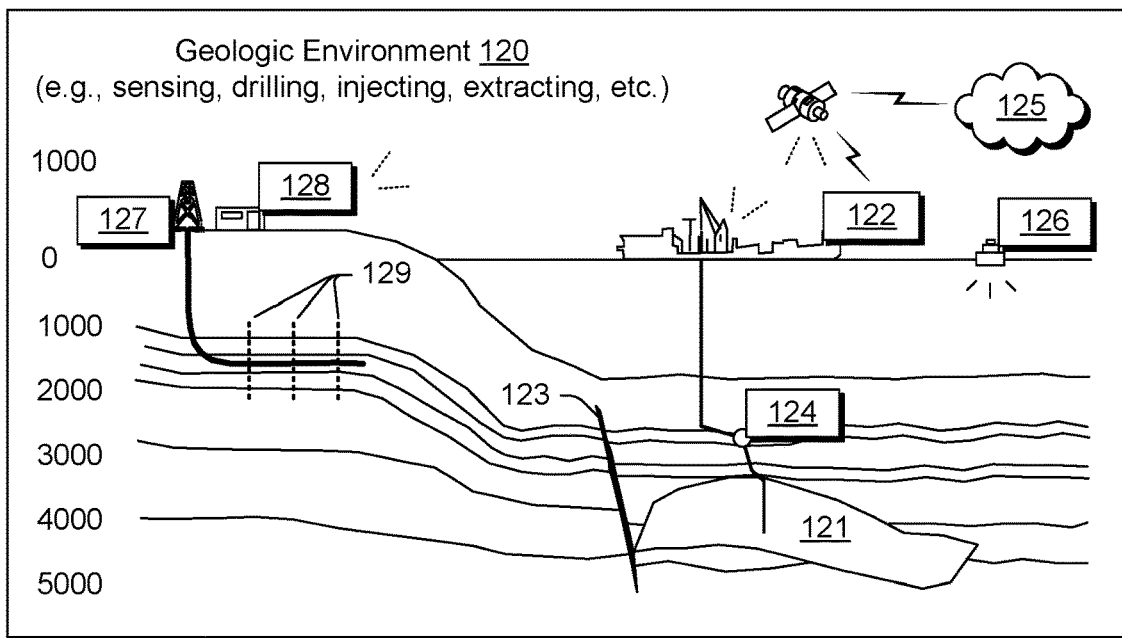
FIG. 1 illustrates examples of equipment in a geologic environment.
Figure 1:
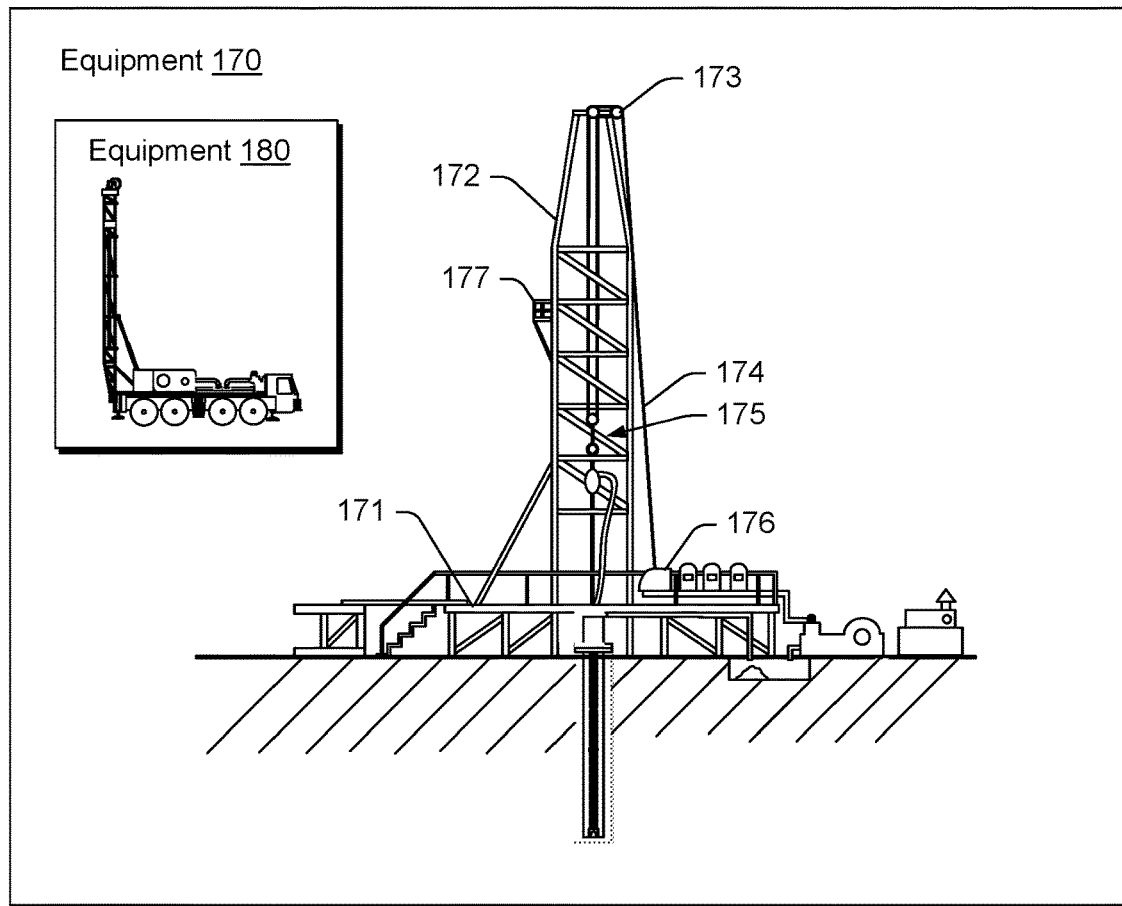

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion (e.g., a lateral portion) that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system (e.g., an offshore rig, etc.).

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

Figure 2:
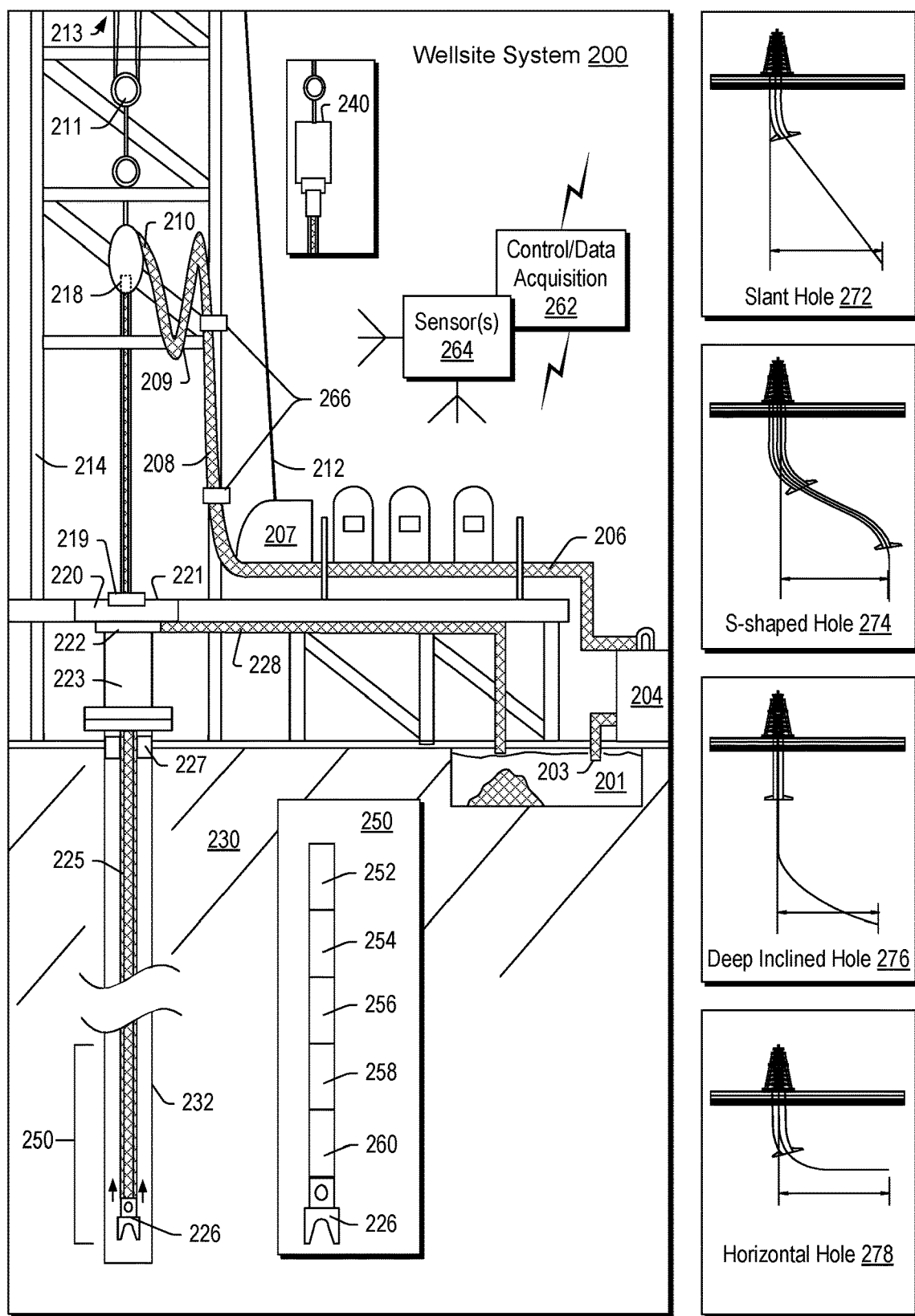
FIG. 2 illustrates examples of equipment and examples of hole types.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end.

As an example, the drillstring assembly 250 may be a bottom hole assembly (BHA).

The wellsite system 200 can provide for operation of the drillstring 225 and other operations. As shown, the wellsite system 200 includes the traveling block 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the MWD module 256 of the drillstring assembly 250. Where the position of an LWD module is mentioned, as an example, it may refer to a module at the position of the LWD module 254, the MWD module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD 254 module 256 may include equipment for generating electrical power, for example, to power various components of the drillstring 225. As an example, the MWD module 256 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
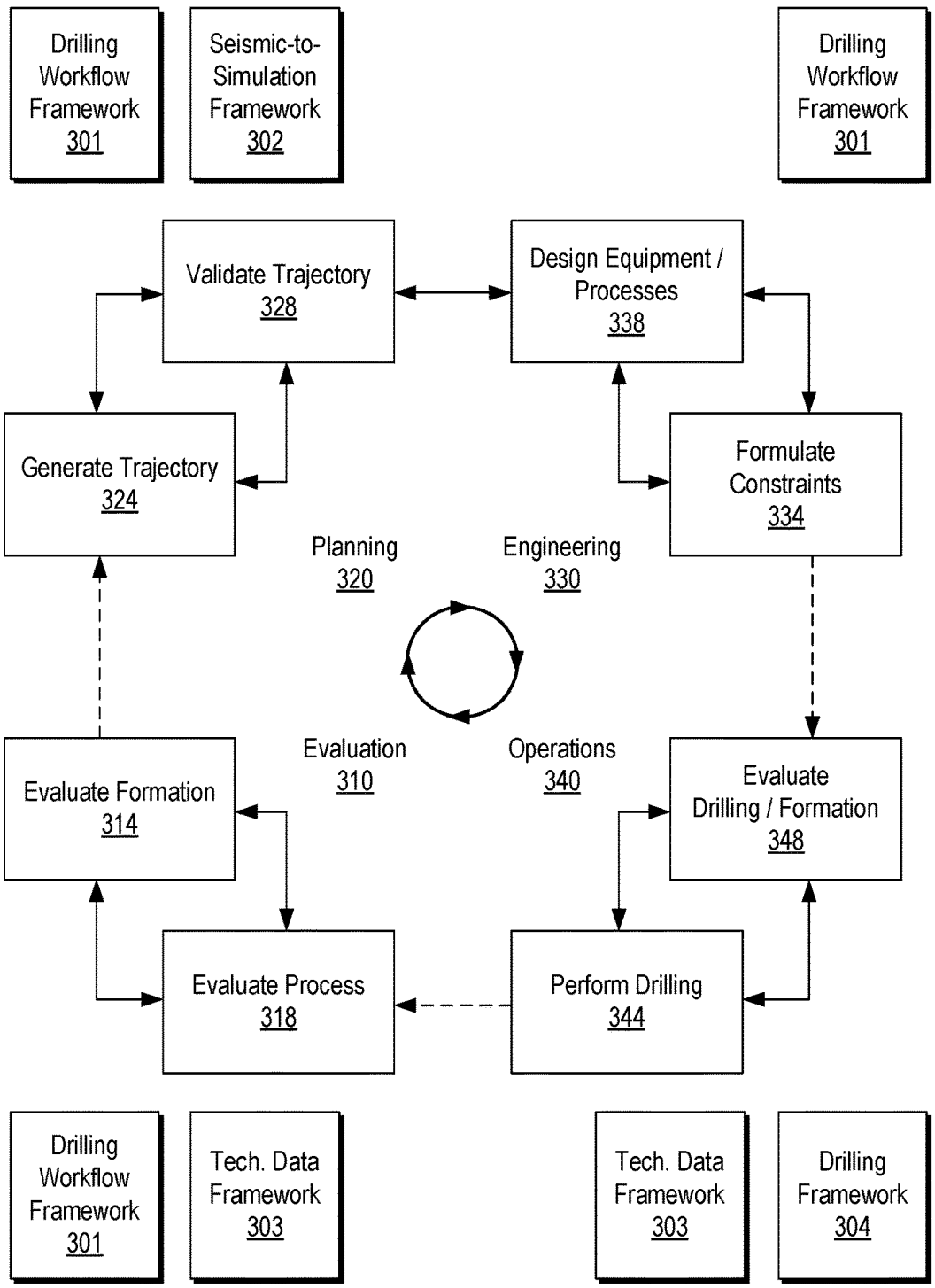
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL framework (Schlumberger, Houston, Texas) and the technical data framework 303 can be, for example, the TECHLOG framework (Schlumberger, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a framework can include an analysis component that may allow for interaction with a model or model-based results (e.g., simulation results, etc.). As to simulation, a framework may operatively link to or include a simulator such as the ECLIPSE reservoir simulator (Schlumberger, Houston Texas), the INTERSECT reservoir simulator (Schlumberger, Houston Texas), etc.

The aforementioned PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As mentioned with respect to the DELFI environment, one or more frameworks may be interoperative and/or run upon one or another. As an example, a framework environment marketed as the OCEAN framework environment (Schlumberger, Houston, Texas) may be utilized, which allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. In a framework environment (e.g., OCEAN, DELFI, etc.), a model simulation layer can include or operatively link to a model-centric framework. In an example embodiment, a framework may be considered to be a data-driven application. For example, the PETREL framework can include features for model building and visualization. As an example, a model may include one or more grids where a grid can be a spatial grid that conforms to spatial locations per acquired data (e.g., satellite data, logging data, seismic data, etc.).

As an example, a model simulation layer may provide domain objects, act as a data source, provide for rendering and provide for various user interfaces. Rendering capabilities may provide a graphical environment in which applications can display their data while user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

As an example, a workflow may be a process implementable at least in part in a framework environment and by one or more frameworks. As an example, a workflow may include one or more worksteps that access a set of instructions such as a plug-in (e.g., external executable code, etc.). As an example, a framework environment may be cloud-based where cloud resources are utilized that may be operatively coupled to one or more pieces of field equipment such that data can be acquired, transmitted, stored, processed, analyzed, etc., using features of a framework environment. As an example, a framework environment may employ various types of services, which may be backend, frontend or backend and frontend services. For example, consider a client-server type of architecture where communications may occur via one or more application programming interfaces (APIs), one or more microservices, etc.

As an example, a framework may provide for modeling petroleum systems. For example, the modeling framework marketed as the PETROMOD framework (Schlumberger, Houston, Texas), which includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

As an example, various aspects of a workflow may be completed automatically, may be partially automated, or may be completed manually, as by a human user interfacing with a software application that executes using hardware (e.g., local and/or remote). As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one or more software applications. Such designs may be stored in one or more databases maintained by one or more servers, which may, for example, employ STUDIO framework tools (Schlumberger, Houston, Texas), and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc., basis.

Well planning can include determining a path of a well (e.g., a trajectory) that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
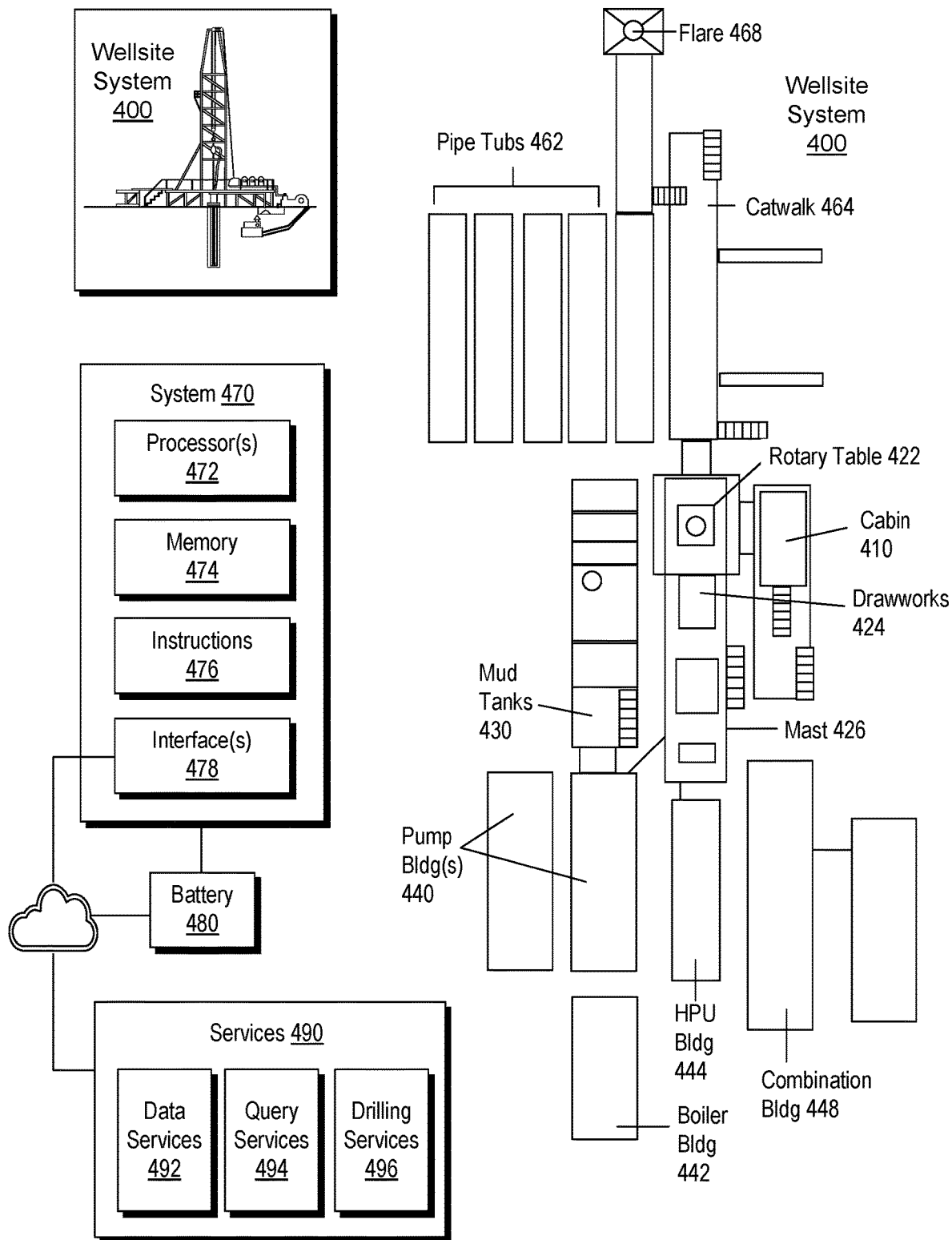
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, the system 470 may be utilized to generate one or more rate of penetration drilling parameter values, which may, for example, be utilized to control one or more drilling operations.

Figure 5:
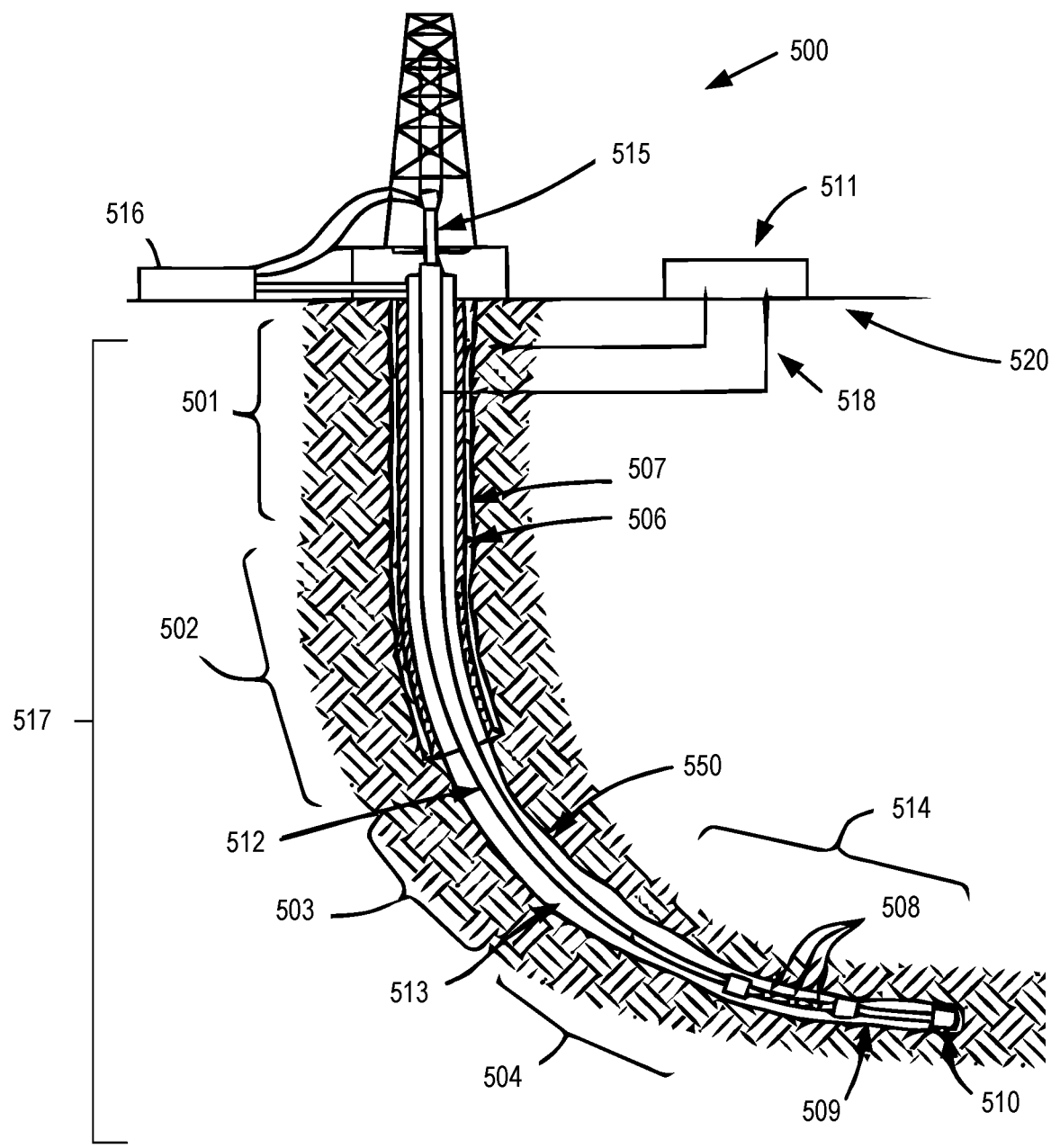
FIG. 5 illustrates an example of equipment in a geologic environment.

FIG. 5 shows a schematic diagram depicting an example of a drilling operation of a directional well in multiple sections. The drilling operation depicted in FIG. 5 includes a wellsite drilling system 500 and a field management tool 520 for managing various operations associated with drilling a bore hole 550 of a directional well 517. The wellsite drilling system 500 includes various components (e.g., drillstring 512, annulus 513, bottom hole assembly (BHA) 514, kelly 515, mud pit 516, etc.). As shown in the example of FIG. 5, a target reservoir may be located away from (as opposed to directly under) the surface location of the well 517. In such an example, special tools or techniques may be used to ensure that the path along the bore hole 550 reaches the particular location of the target reservoir.

As an example, the BHA 514 may include sensors 508, a rotary steerable system (RSS) 509, and a bit 510 to direct the drilling toward the target guided by a pre-determined survey program for measuring location details in the well. Furthermore, the subterranean formation through which the directional well 517 is drilled may include multiple layers (not shown) with varying compositions, geophysical characteristics, and geological conditions. Both the drilling planning during the well design stage and the actual drilling according to the drilling plan in the drilling stage may be performed in multiple sections (see, e.g., sections 501, 502, 503 and 504), which may correspond to one or more of the multiple layers in the subterranean formation. For example, certain sections (e.g., sections 501 and 502) may use cement 507 reinforced casing 506 due to the particular formation compositions, geophysical characteristics, and geological conditions.

In the example of FIG. 5, a surface unit 511 may be operatively linked to the wellsite drilling system 500 and the field management tool 520 via communication links 518. The surface unit 511 may be configured with functionalities to control and monitor the drilling activities by sections in real time via the communication links 518. The field management tool 520 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 518 according to a drilling operation workflow. The communication links 518 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM toolkit framework (Schlumberger Limited, Houston, Texas).

As an example, a service can be or include one or more of OPTIDRILL, OPTILOG and/or other services marketed by Schlumberger Limited, Houston, Tex.

The OPTIDRILL technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO framework).

The OPTILOG technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITSML). WITS/WITSML specify how a drilling rig or offshore platform drilling rig can communicate data. For example, as to slips, which are an assembly that can be used to grip a drillstring in a relatively non-damaging manner and suspend the drillstring in a rotary table, WITS/WITSML define operations such as "bottom to slips" time as a time interval between coming off bottom and setting slips, for a current connection; "in slips" as a time interval between setting the slips and then releasing them, for a current connection; and "slips to bottom" as a time interval between releasing the slips and returning to bottom (e.g., setting weight on the bit), for a current connection.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquire information about conditions, which may be for conditions of drilling equipment, conditions of a formation, conditions of fluid(s), conditions as to environment (e.g., weather, sea, etc.), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., and implemented at the optimal time).

Figure 6:
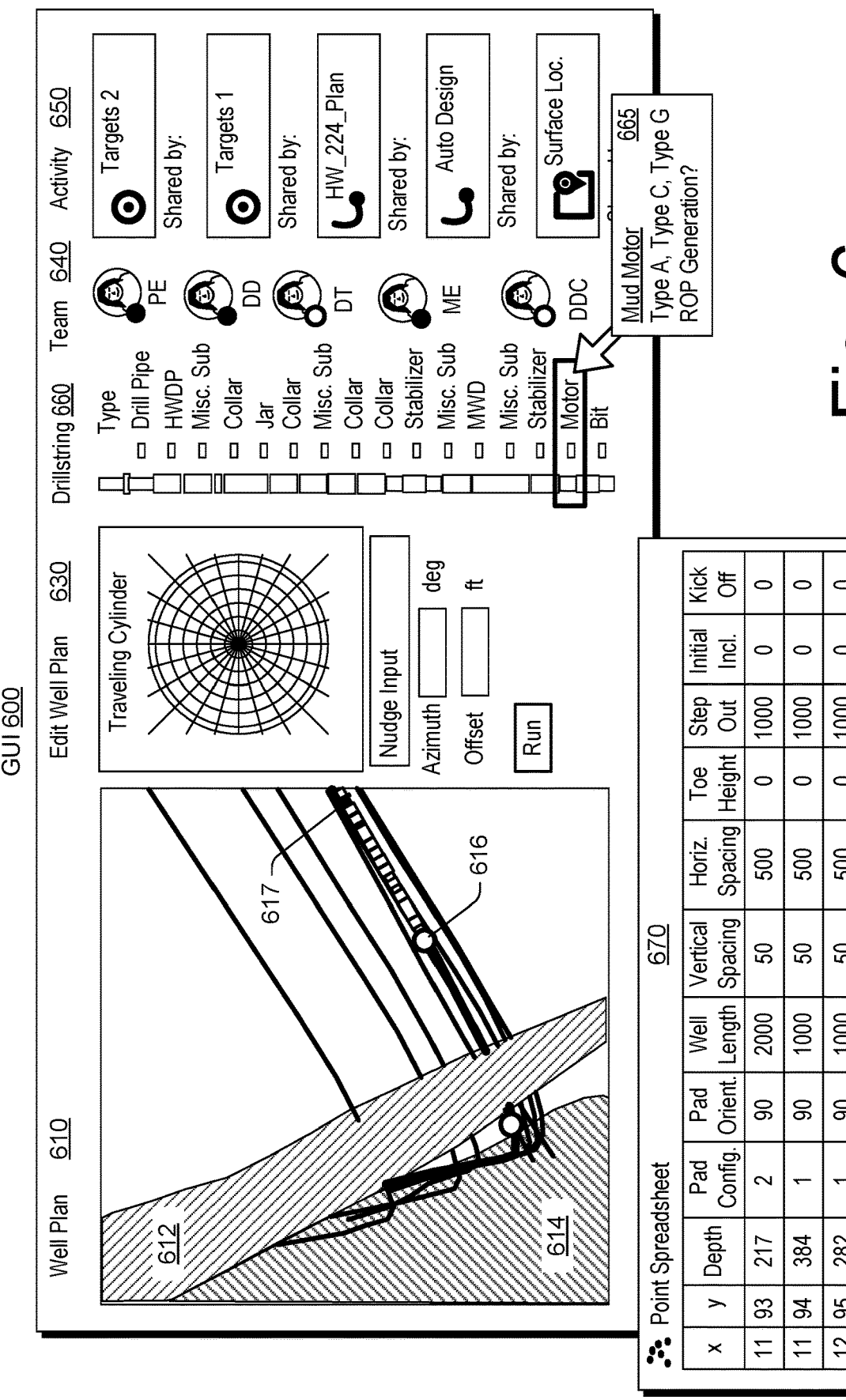
FIG. 6 illustrates an example of a graphical user interface.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650.

As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). In the example of FIG. 6, the drillstring graphical control 660 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

As an example, a workflow can include utilizing the graphical control of the drillstring 660 to select and/or expose information associated with a component or components such as, for example, a bit and/or a mud motor. In the example of FIG. 6, a graphical control 665 is shown that can be rendered responsive to interaction with the graphical control of the drillstring 660, for example, to select a type of component and/or to specify one or more features of the drillstring 660 (e.g., for training a neural network model, etc.).

FIG. 6 also shows an example of a table 670 as a point spreadsheet that specifies information for a plurality of wells. As shown in the example table 670, coordinates such as "x" and "y" and "depth" can be specified for various features of the wells, which can include pad parameters, spacings, toe heights, step outs, initial inclinations, kick offs, etc.

Figure 7:
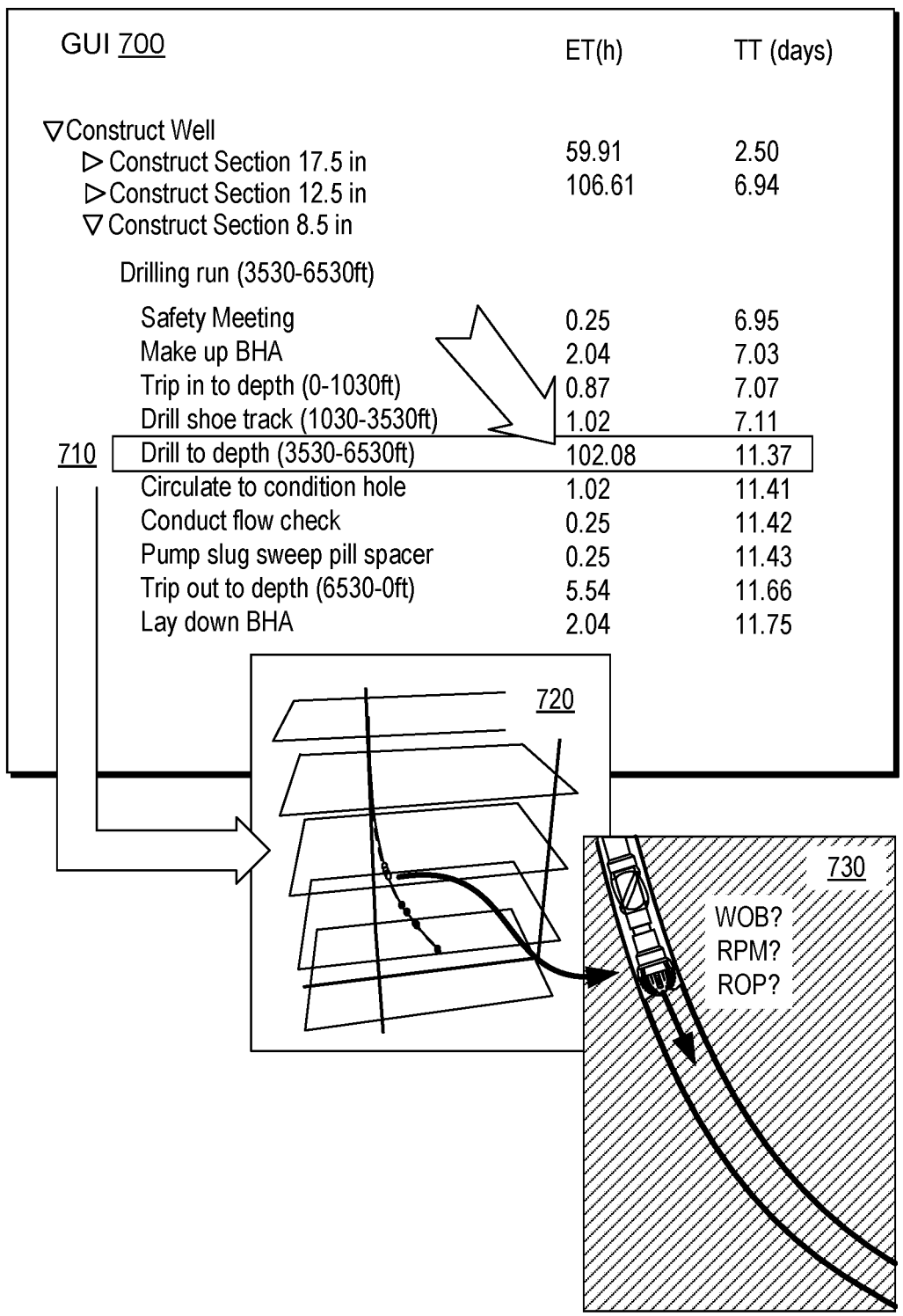
FIG. 7 illustrates an example of a graphical user interface.

FIG. 7 shows an example of a graphical user interface 700 that includes various types of information for construction of a well where times are rendered for corresponding actions. In the example of FIG. 7, the times are shown as an estimated time (ET) in hours and a total or cumulative time (TT), which is in days. Another time may be a clean time, which can be for performing an action or actions without occurrence of non-productive time (NPT) while the estimated time (ET) can include NPT, which may be determined using one or more databases, probabilistic analysis, etc. In the example of FIG. 7, the total time (TT or cumulative time) may be a sum of the estimated time column. As an example, during execution and/or replanning the GUI 700 may be rendered and revised accordingly to reflect changes. As shown in the example of FIG. 7, the GUI 700 can include selectable elements and/or highlightable elements. As an example, an element may be highlighted responsive to a signal that indicates that an activity is currently being performed, is staged, is to be revised, etc. For example, a color coding scheme may be utilized to convey information to a user via the GUI 700.

As to the highlighted element 710 ("Drill to depth (3530-6530 ft)") the estimated time is 102.08 hours, which is greater than four days. For the drilling run for the 8.5 inch section of the borehole, the highlighted element 710 is the longest in terms of estimated time. FIG. 7 also shows a GUI 720 for a borehole trajectory and a GUI 730 of a drillstring with a drill bit where drilling may proceed according to a weight on bit (WOB) and a rotational speed (RPM) to achieve a rate of penetration (ROP).

As an example, the GUI 700 can be operatively coupled to one or more systems that can assist and/or control one or more drilling operations. For example, consider a system that generates rate of penetration values, which may be, for example, rate of penetration set points. Such a system may be an automation assisted system and/or a control system. For example, a system may render a GUI that displays one or more generated rate of penetration values and/or a system may issue one or more commands to one or more pieces of equipment to cause operation thereof at a generated rate of penetration (e.g., per a WOB, a RPM, etc.). As an example, a time estimate may be given for the drill to depth operation using manual, automated and/or semi-automated drilling. For example, where a driller enters a sequence of modes, the time estimate may be based on that sequence; whereas, for an automated approach, a sequence can be generated (e.g., an estimated automated sequence, a recommended estimated sequence, etc.) with a corresponding time estimate. In such an approach, a driller may compare the sequences and select one or the other or, for example, generate a hybrid sequence (e.g., part manual and part automated, etc.).

Figure 8:
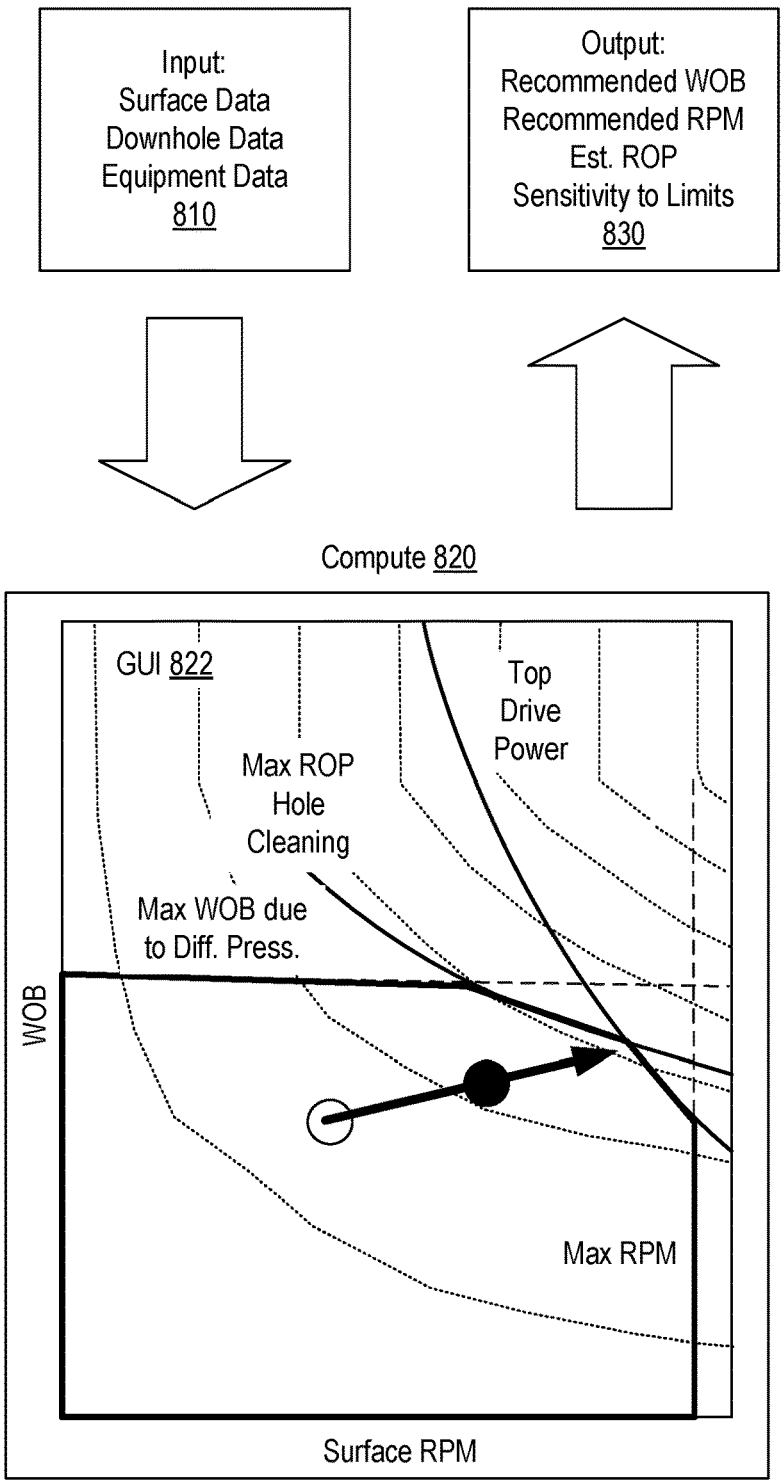
FIG. 8 illustrates an example of an automated rate of penetration system.

FIG. 8 shows an example of an automated ROP system 800 that includes an input block 810, a compute block 820 and an output block 830. As shown in FIG. 8, various data can be received by the compute block 820 to generate WOB and surface RPM values that may aim to optimize drilling according to various constraints where a GUI 822 may be rendered to a display for visualization by an operator that controls drilling equipment (e.g., rig equipment, etc.). In the example of FIG. 8, the drilling may include use of a drillstring with or without a mud motor. Various types of conditions may be taken into account as constraints and/or goals. For example, consider a goal of drilling fast (high ROP) and/or a goal of making it to the end of a drilling run without having to replace the drill bit. A replacement of a drill bit due to wear demands having to trip out of hole as indicated in an entry "Trip out to depth" in the GUI 700 of FIG. 7, which takes approximately 5.5 hours. Further, replacement demands "Lay down BHA", which takes approximately 2.04 hours, along with other actions such as "Make up BHA" and "Trip in to depth". As such, replacement of a drill bit before reaching a desired measured depth may result in a substantial amount of NPT. Hence, a tradeoff can exist between ROP and bit wear. In various instances, where a likelihood of reaching a targeted measured depth is high and bit integrity is sufficiently high, ROP may be increased (e.g., by increasing one or more of WOB, RPM, etc.).

In the example of FIG. 8, the automated ROP system 800 can receive data during drilling. For example, consider receipt of well calibrated time based (e.g., every 3 seconds) surface parameters such as one or more of standpipe pressure (SPPA), hookload, hole depth, bit depth, block position, surface torque, RPM, flow in, rig state and consider receipt of downhole data where available per drillstring sensor(s) (e.g., DWOB and DTOR).

In various instances, an automated calibration routine or routines may be utilized to automatically detect off bottom rotating weight and torque, and SPPA at a flow rate (e.g., for a motor assembly), to allow the computation of estimated DTOR and motor differential pressure.

As an example, the automated ROP system 800 may utilize change point technology to automatically fit a model of cutting action of a drill bit to real-time measurements (e.g., where, in the case of a motor assembly, motor RPM may be taken into consideration). As an example, a model of a drill bit can be used to compute contours of ROP within a WOB/RPM space (see, e.g., the GUI 822 of FIG. 8).

Figure 9:
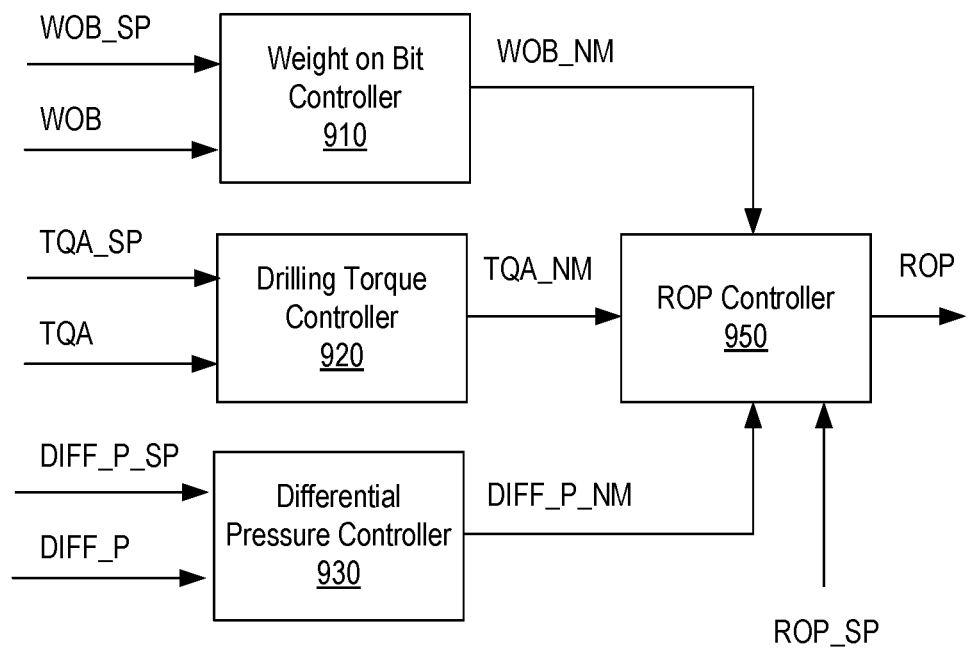
FIG. 9 illustrates an example of a system.

FIG. 9 shows an example of a system 900 that includes a series of controllers 910, 920 and 930 that generate output for receipt by another controller 950. The system 900 may be referred to as an autodriller system or an "AutoROP" system or a "ROPO" system. As shown, the controller 910 is a weight on bit (WOB) controller, the controller 920 is a drilling torque (TQA) controller, the controller 930 is a differential pressure (DIFF_P) controller and the controller 950 is a rate of penetration (ROP) controller. Each of the controllers 910, 920, 930 and 950 receives a corresponding set point (SP) value where each of the controllers 910, 920 and 930 receives a measured value (e.g., a WOB measurement, a TQA measurement and a DIFF_P measurement, respectively). Each of the controllers 910, 920 and 930 outputs a normalized (NM) value (e.g., scaled from 0 to 1, etc.) that is received by the ROP controller 950. The ROP controller 950 utilizes the normalized (NM) values and a ROP set point (SP) value to generate a ROP output.

As an example, a method can include providing input limits that can define a "safe operating envelope" for the system 900, as may be utilized for controlling equipment at a rigsite. The system 900 can be utilized to identify optimum parameters, for example, to maximize on bottom ROP and provide recommendations that guide a driller towards an optimum point (e.g., via computing the contours of ROP as in the block 820 of FIG. 8).

In a ROP optimization (ROPO) scenario, for managing transitions, the ROPO can automatically detect formation changes and make adjustments to drilling parameter recommendations (e.g., to optimize ROP). However, in certain circumstances (e.g., drilling difficult intervals with stringers that may have substantial variance in formation properties over short intervals) drilling operations may have one or more priorities that are ranked higher than maximizing ROPO. For example, consider picking parameters that minimize the risk of damaging a bit cutting structure during a transition or transitions. In various instances, stringer drilling strategies can be called for under conditions such as intercalated intervals.

As to slide drilling, a system may be unable to estimate with surface data the weight that is reaching the bit. In such an example, ROP optimization can be a secondary or lesser concern when sliding as toolface control may be a higher priority.

A ROPO system can provide various levels of support for factors such as for shock and vibration (S&V). For example, consider a system that can monitor vibration levels and automatically trigger mitigation responses; noting that user intervention may be utilized to modify limits within difficult intervals. In some circumstances, a control system may be suboptimal and a user may take back control (e.g., ignoring ROPO system recommendations) where S&V is or may become an ROP limiter.

Referring again to the system 900 of FIG. 9, as mentioned, the system 900 may be referred to as an "autodriller" or "AutoROP" system. As mentioned, inputs to the system 900 include ROP, WOB, TQA, and DIFF_P set points (SPs) and measured values. Further, each of the controllers 910, 920 and 930 can include various control parameters, depending on type of control implemented. For example, consider controller schemes that utilize gain such that each of the controllers 910, 920 and 930 receives a gain value.

The system 900 may be described as including two sections, one being proportional and integral loops (P-I loops, which relate to control of WOB, TQA and DIFF_P) and the other being ROP output computation. In such an example, the P-I loops, the set point and measured values are inputs, as well as a gain that scales the proportional and integral gains (e.g., scaled together). The ROP output computations, as explained, can use the outputs from each of the three P-I loops, as well as the ROP set point and measured value, to calculate an ROP output. As an example, the ROP output can be a signal such as instruction, a command, etc., that can be transmitted to equipment operatively coupled to or otherwise including drawworks.

In the example of FIG. 9, the system 900 includes various types of inputs that can have an impact on its behavior and what ROP output is generated. In a user setup scenario, a user can attempt to select the inputs (ROP, WOB, TQA, and DIFF_P set points and the three controller scheme gain values) to elicit a desirable drilling behavior. However, the expertise to select the various input values may be lacking and/or demand some amount of trial and error or other iterative process on behalf of the user. Further, experience may be for certain types of wells, certain types of equipment, etc., where a user may be unfamiliar with one or more factors. If a user does not have a high level of confidence in his ability to select such values to generate desirable behavior, then the user may be less likely to utilize a system such as the system 900 during drilling an entire well or one or more portions of a well.

As an example, method can include training a machine learning model to generate a trained machine learning model that can facilitate decision making and/or determinations as to one or more inputs to a system such as the system 900 of FIG. 9. In such an example, a method can include receiving sensor data; determining a rate of penetration drilling parameter value using a trained neural network and at least a portion of the sensor data; and issuing a control instruction for drilling a borehole using the determined rate of penetration drilling parameter value. In such an example, the trained neural network can include features that can model and/or generate inputs concerning an environment and/or one or more controllers.

As an example, a machine learning approach can bridge a knowledge and/or a comfort gap that a user may have with respect to a system that can provide ROP output. For example, a trained machine learning model can help to automate or automate a process of selecting inputs in a way that aims to result in a defined, desirable drilling behavior.

Figure 10:
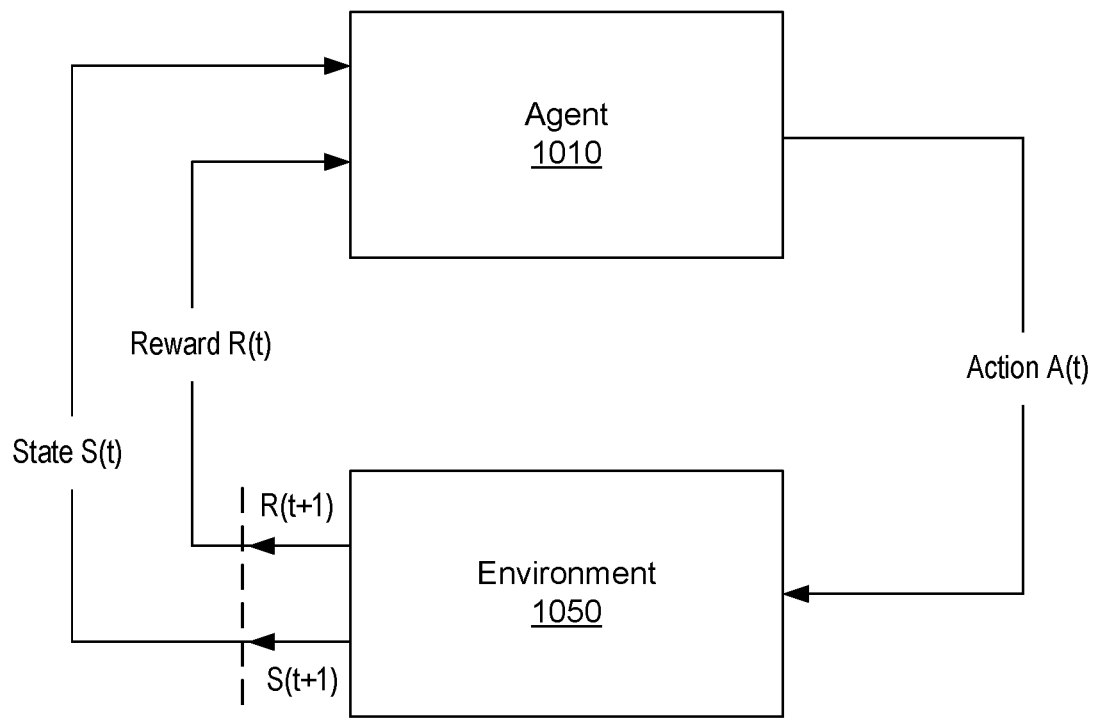
FIG. 10 illustrates an example of a system.

FIG. 10 shows an example of a system 1000 that includes an agent 1010 and an environment 1050 where the agent 1010 interacts with the environment 1050 through action A, state S, and reward R.

For example, the agent 1010 can observe a state from the environment 1050, and make a decision as to one or more actions. An action (or actions) can then be applied to the environment 1050, and the environment 1050 can yield a reward as a feedback to the agent 1010, together with a new state which the agent 1010 observes in a subsequent round (e.g., a next round). The goal of the agent 1010 can be to take actions that maximize the total future rewards.

As an example, an agent can be trained using rewards where an action can have an associated reward scheme. As mentioned, an action can have positive aspects and/or negative aspects with respect to one or more goals.

As an example, an agent can be trained and/or implemented using one or more safety constraints. For example, a safety constraint can be utilized to help assure that an optimal sequence of control instructions abides by one or more safety constraints and/or does not get implemented without assessment with respect to one or more safety constraints.

As to a reward calculator, it can receive a state from a simulator, and calculate the rewards to feedback to an agent. In such an example, the reward calculator evaluates the reward based on one or more considerations. Rewards can be positive or negative.

As an example, a method can involve a Q function approach for reinforcement learning using a deep neural network. An article by Mnih et al., Human-level control through deep reinforcement learning, Nature, Vol. 518: pp. 529-533, is incorporated by reference herein. As an example, a method can include deep Q-learning using a deep Q-learning network (DQN). As to some other types of examples, consider a deep deterministic policy gradient (DDPG) network or a proximal policy optimization (PPO).

As an example, an agent can be trained using reinforcement learning through estimating a Q function using a deep neural network. In such an example, the Q-value can be referred to as an action value, which can be defined as the expected long-term return with discount when taking a given action. Given a policy $\pi$, state s, and action a, the Q value can be estimated as:

$$Q^\pi(s,a) = E[r_{t+1} + \gamma r_{t+2} + \gamma^2 r_{t+3} + \ldots | s, a],$$

where $\gamma$ is the discount factor or the reward r, and t is the step count.

As to the Q-function, it is a prediction of future reward based on state and action pair. To act optimally with policy π*, an action is chosen that yields the highest optimal Q-function (Q*) value among possible actions at the current step t.

$$\pi^*(s) = \underset{a}{\mathrm{argmax}}\, Q^*(s, a)$$

The Q* function can be expressed into a Bellman equation in a recurrent form, where s' and a' are the next state and next action:

$$Q^*(s, a) = E\left[r + \gamma \underset{a'}{\max}\, Q^*(s', a') \,\Big|\, s, a\right].$$

The Bellman equation can be solved iteratively, and Q* can then be estimated through a neural network. To train a neural network, a loss function may be defined as the mean-square-error of the predicted Q* using the Bellman equation. The loss can then be minimized by stochastic gradient descent and back propagation. Such an approach generates weights that define the agent and make the agent trained for receiving input and generating output.

As an example, a noise approach can be implemented that utilizes a noisy layer. In such an example, noise can be parameter noise, which may allow for expedited training compared to approaches without parameter noise (e.g., consider comparing parameter noise to action noise). Parameter noise can add adaptive noise to parameters of a neural network policy, rather than to its action space. Action space noise acts to change the likelihoods associated with each action an agent might take from one moment to the next. Parameter space noise injects randomness directly into parameters of an agent, altering the types of decisions it makes such that they depend on what the agent currently senses.

As an example, training can utilize deep reinforcement learning (DRL) and parameter noise. As an example, noise may be introduced via simulation such as via a drilling model simulator.

As an example, the type of noise applied to a neural network (e.g., parameter noise) can differ from the type of noise applied to a simulator. For example, parameter space noise can be applied via a noisy layer that can provide for improved exploration of a DRL agent while domain randomization can be a noise that is applied to a simulator that can provide for a more robust agent and that can facilitate transfer from a simulated environment to a real-world environment.

Figure 11:
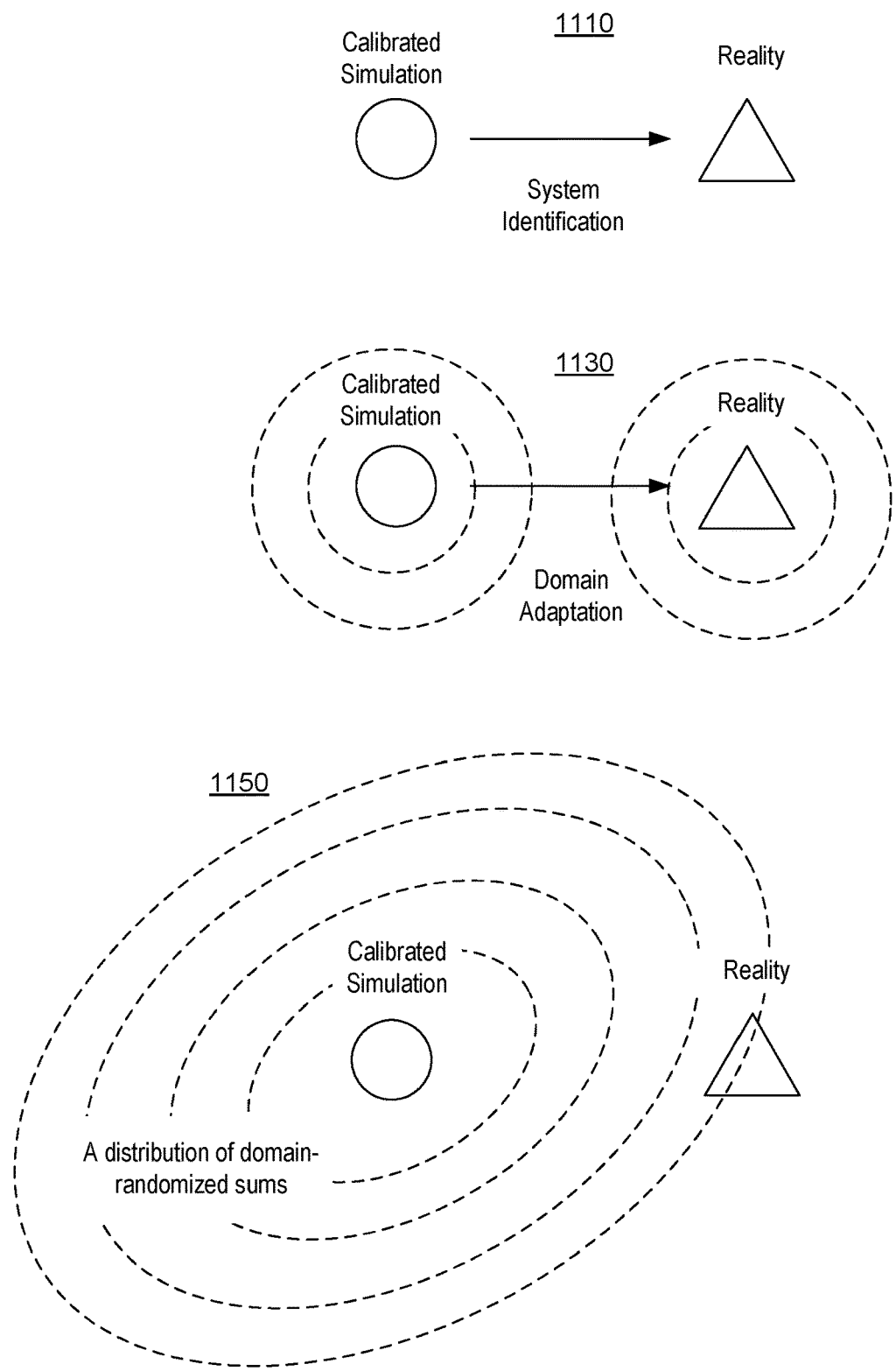
FIG. 11 illustrates examples of approaches to link simulation and reality.

FIG. 11 shows various examples of approaches for handling simulation and reality. For example, in an approach 1110, a calibrated simulation aims to provide for system identification as to reality; in an approach 1130, domain adaptation is utilized to bridge a calibrated simulation with reality; and, in an approach 1150, a distribution of domain-randomized sums is utilized to encapsulate at least a portion of reality.

As to types of randomizations, these can be dependent on the types of tasks. For example, for a robot that utilizes machine vision, appearance, scene/object and/or physics randomization may be utilized. As to appearance, aspects such as color, lighting, reflectivity, etc., may be utilized. As to scene/object, aspects such as real and unreal objects may be utilized where training on unreal objects may enhance training as to real objects. As to physics, aspects such as dimensions, masses, friction, damping, actuator gains, joint limits and gravity may be utilized.

As an example, randomization may be for mass and dimensions of objects, mass and dimensions of robot bodies, damping, friction of the joints, gains for a PID controller (e.g., P term), joint limit, action delay, observation noise, etc.

As an example, safety can be a desirable aspect of reinforcement learning when a physical system operates in the real-world, particularly where equipment, humans, formations, the environment, etc., may be damaged. Various techniques may be utilized for purposes of safety. For example, consider a system that integrates temporal logic guided reinforcement learning (RL) with control barrier functions (CBFs) and control Lyapunov functions. Such an approach can be beneficial in sim-to-real transfer whereby real-world control via a trained agent occurs with some assurances as to safety concerns.

Figure 12:
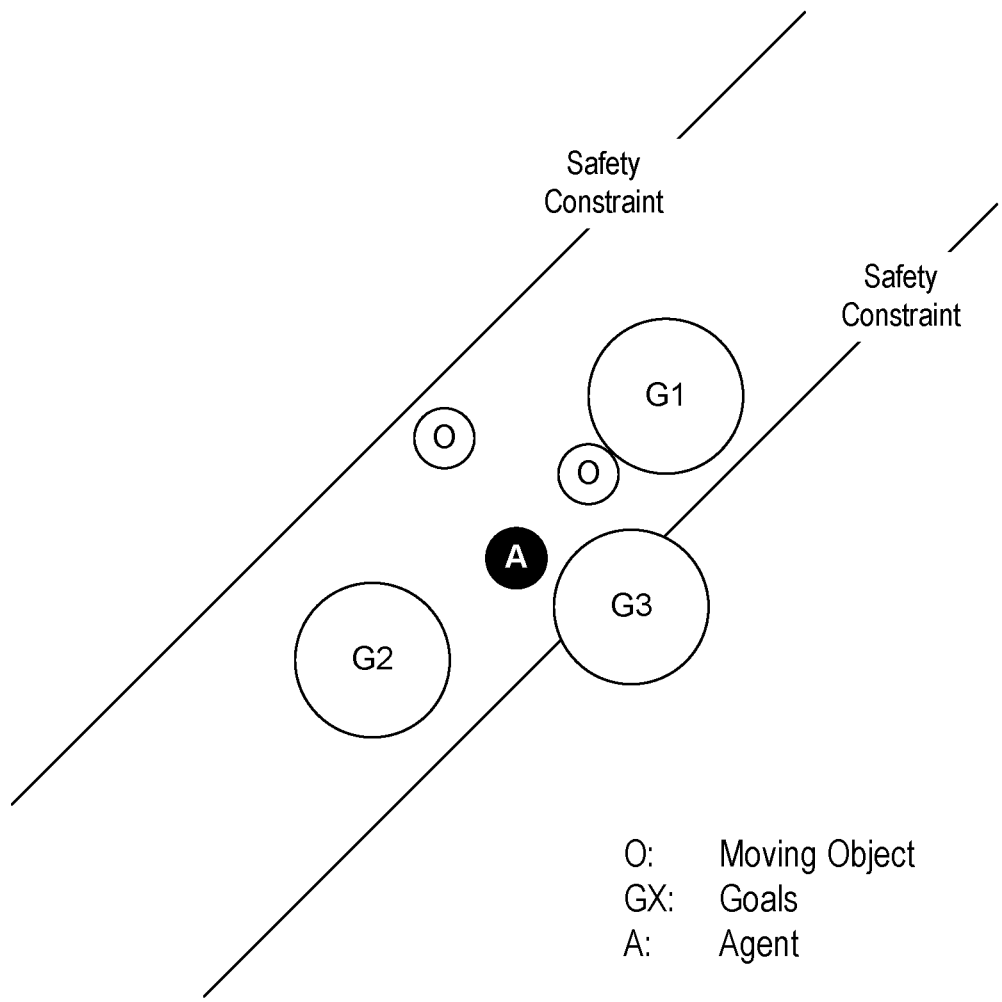
FIG. 12 illustrates an example of a method.

As shown in FIG. 12, a method 1200 can include a local control system that can be configured to verify instructions against its own set of constraints. In particular, FIG. 12 shows an example of a simulation environment that includes an agent with known dynamics, safety constraints in the form of two straight lines forming a channel that the agent has to stay within, three circular goal regions whose positions are kept fixed in an episode but can be randomized between episodes, and two obstacles that move in the vicinity of the channel and whose dynamics are unknown.

In the example of FIG. 12, for a reinforcement learning (RL) component, a learning algorithm can employ proximal policy optimization. For example, a policy can be represented by a feed-forward neural network (NN).

As an example, a minimum distance between an agent and one or more moving obstacles as a function of policy updates can be tracked to show that, as learning progresses, the agent learns to stay away from the moving obstacles. As to actual task oriented behaviors, the agent A in FIG. 12 may start close to and try to move towards G2; however, via learning, the agent A can know that if it keeps trying to get to G2 it will get stuck at the border (safety constraint) and receive a low return. Therefore, near the border (safety constraint) the agent A chooses to instead move towards G1 and eventually finish the task. Depending on training, a RL agent may choose an obstacle free path and try to make a tradeoff between accomplishing the task, avoiding obstacles and minimizing safety violations (e.g., as may be controlled by weights, etc.).

As an example, during an evaluation phase, during evaluation an episode can terminate in a number of circumstances such as, for example, a horizon is reached, a task is accomplished and an RL agent collides with a moving obstacle (e.g., defined by a minimum threshold on relative distance, etc.). As explained, to ensure safety, one or more control barrier functions (CBFs) can be enabled (e.g., turned on). As an example, RL agents trained with CBFs can exhibit higher success rates as, for example, RL agents trained without CBF sometimes rely on traveling outside a safe zone (e.g., safety constraints) to avoid obstacles and get to goals. As an example, an agent may be trained using reinforcement learning with one or more control barrier functions (CBFs).

Figure 13:
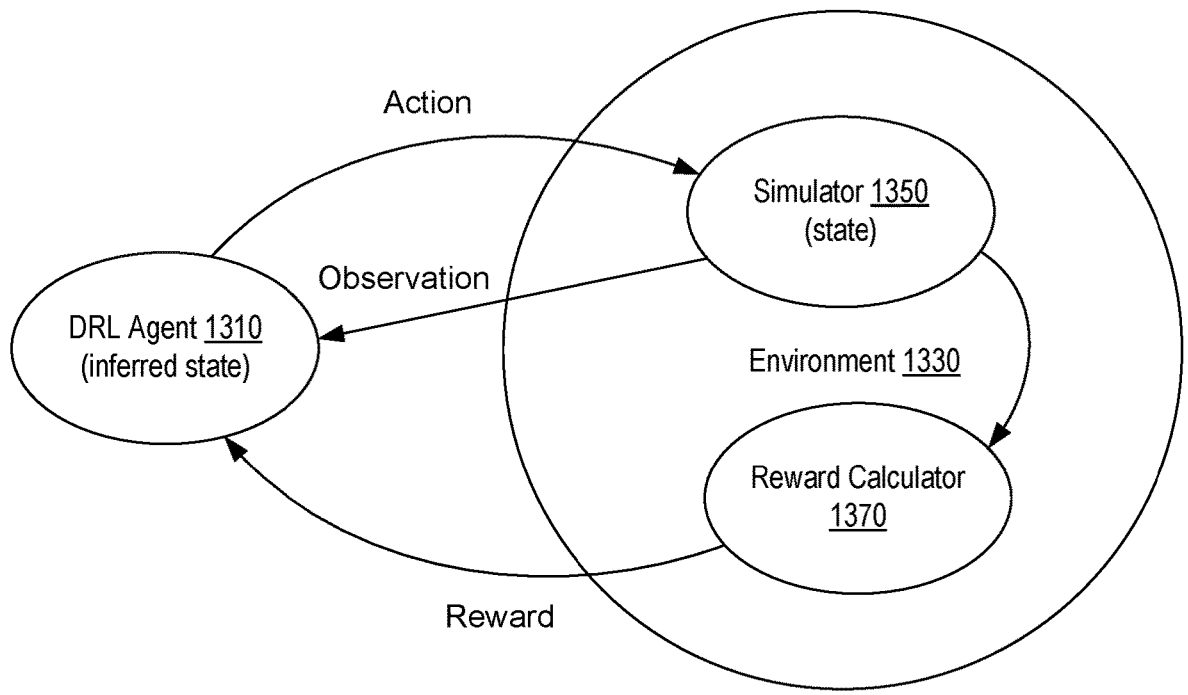
FIG. 13 illustrates an example of a system.
Figure 13:
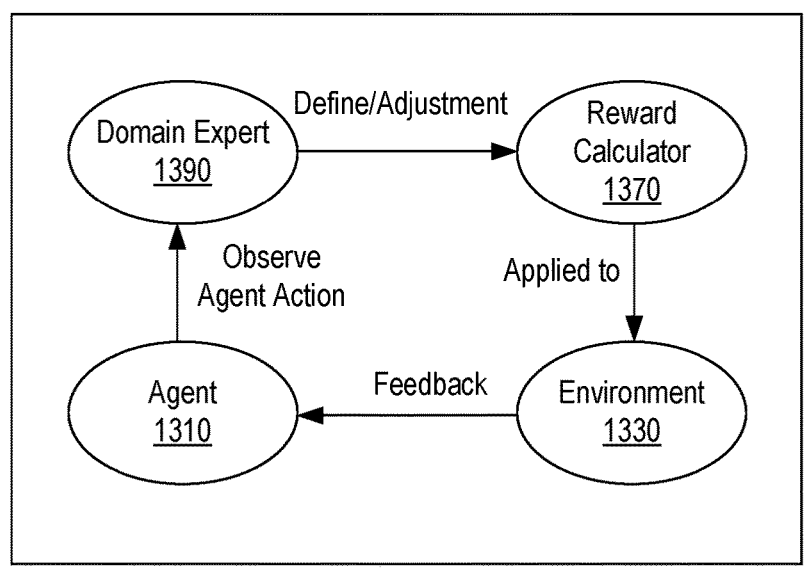

FIG. 13 shows an example of a system 1300 that can be utilized for training an agent such as a deep reinforcement learning agent (DRL agent) 1310 using an environment 1330 that includes a simulator 1350 and a reward calculator 1370.

As shown in FIG. 13, the agent 1310 issues an action to the simulator 1350 in the environment 1330 where the simulator 1350 provides information to the reward calculator 1370 that can generate a reward that is transmitted to the agent 1310 (e.g., to impact operation of the agent 1310). As shown, the simulator 1350 can provide an observation to the agent 1310, which can provide for assessment of an inferred state. For example, the simulator 1350 can generate a simulated state while the agent 1310, which is outside of the environment 1330, can perceive an inferred state.

FIG. 13 also shows an example of a loop where a domain expert 1390 may be utilized that can make one or more adjustments to and/or one or more definitions for operation of the reward calculator 1370. For example, feedback from the environment 1330 can cause the agent 1310 to issue an action, which can be observed (e.g., assessed, analyzed, etc.) by the domain expert 1390 where, based at least in part on such observation, the reward calculator 1370 may be adjusted, further defined, etc. As shown, the reward calculator 1370 can be applied to the environment 1330, as shown in the system 1300. In such an approach, the agent 1310 can be further trained, honed, etc., using domain expertise (e.g., a domain expert and/or other domain expertise). As an example, domain expertise may be from one or more wells that have been drilled using an agent or not using an agent.

As explained, an automated system can be utilized in drilling such as, for example, an automated ROP system (e.g., an autodriller or AutoROP system). As an example, an agent can be trained to generate a trained agent where the trained agent can be part of an automated ROP system. For example, consider a trained agent that can select one or more system parameters to optimize drilling performance. In such an example, the agent can be trained via reinforcement learning to output values for one or more system parameters responsive to input. As to training, optimal drilling performance can be quantified through a reward function that considers tailored characteristics. For example, consider a reward function that favors fast, stable drilling that does not exceed user-defined constraints on drilling parameters that can include weight on bit (WOB), torque (TOR or TQA), and differential pressure (DeltaP or DIFF_P).

As an example, a reward function can be formulated that provides for training of an agent for selecting optimal parameters to enable smooth fast drilling. As to smooth, consider an automated ROP system that includes control features such as proportional and integral control features. In such a system, a quick change in a setpoint may result in some amount of overshoot, oscillation, etc. A smooth system may provide for changes to a setpoint and/or one or more tuning parameters that help to reduce one or more of overshoot, oscillation, etc.

As explained with respect to FIG. 9, an automated ROP system can receive inputs as to ROP, WOB, TQA, and DIFF_P set points and measured values, as well as sets of gains where the system includes P-I loops that relate to control of WOB, torque, and DIFF_P and an ROP output computation. In the P-I loops, the setpoint and measured values are inputs, as well as a gain that scales the proportional control and integral control gains (e.g., scaled together). The ROP output computations use the outputs from each of the P-I loops, as well as the ROP setpoint and measured value, to calculate an ROP output that can be issued to one or more controllers (e.g., drawworks, etc.).

As explained, a user attempts to select the inputs (ROP, WOB, torque, and DIFF_P set points and the three gain values) to elicit desired drilling behavior. In practice, users may lack an understanding of how the inputs affect the behavior or how best to select the inputs to bring about desired drilling behavior. By introduction of a trained agent into an automated ROP system, the trained agent can facilitate selection of one or more parameter values to achieve desired drilling behavior.

As mentioned, an agent can be trained using reinforcement learning (RL). FIG. 10 presents the system 1000 where the agent 1010 takes as inputs a state (e.g., a state that describes a drilling situation) and a reward associated with the current state/environment. The agent 1010 then outputs an action (e.g., selecting one or more new parameters), which are communicated to the environment 1050, which responds to the action.

As explained, the environment 1050 can be a real world drilling scenario or, during a training phase, a digital avatar representation of the real world drilling scenario. As shown in FIG. 10, the response of the environment 1050 includes calculating a new state and reward, which are then fed back into the agent 1010, where the process can repeat. In such an approach, the agent will "learn" (based on the reward feedback) how to appropriately select parameters that will result in a high reward value.

Figure 14:
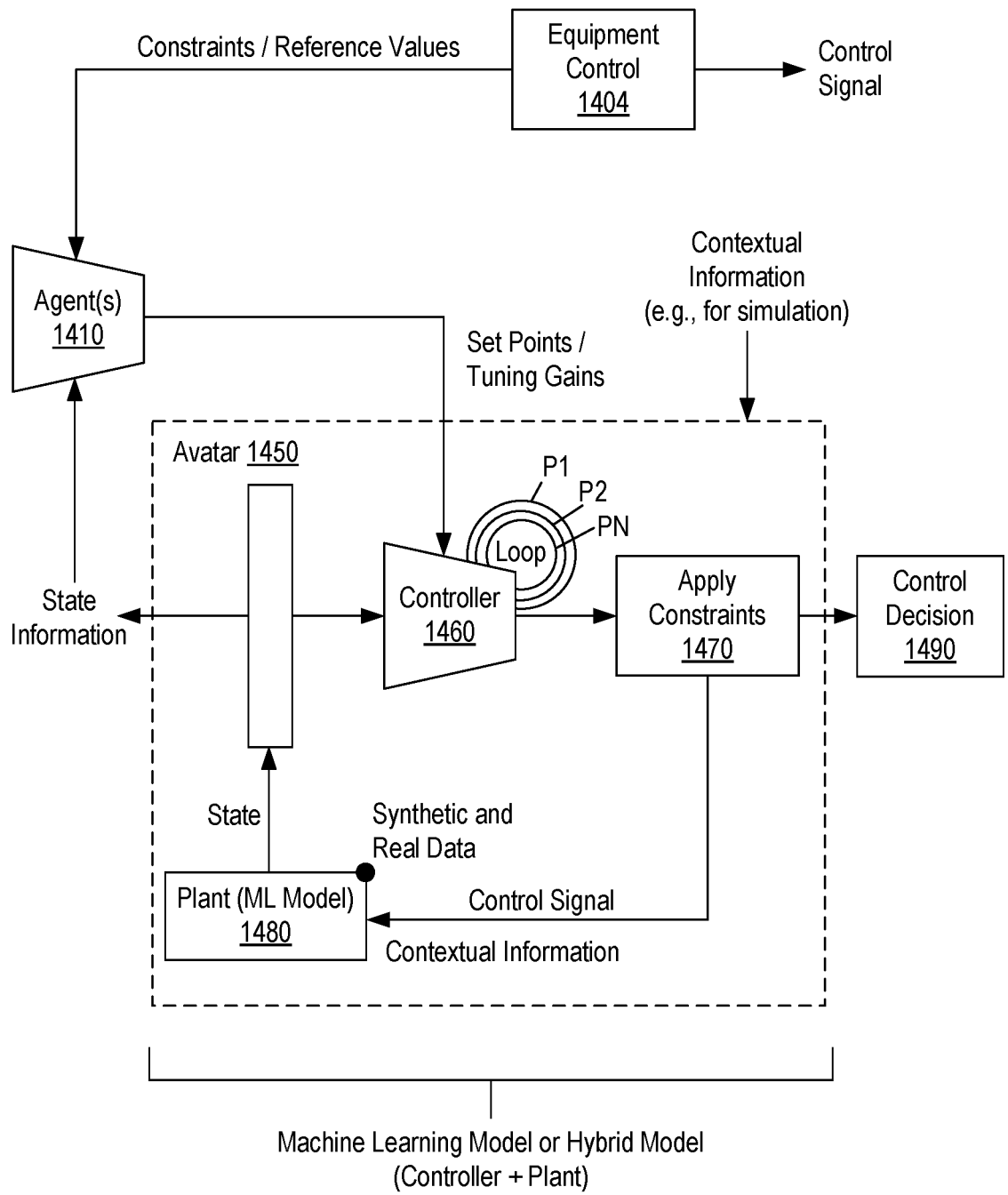
FIG. 14 illustrates an example of a system.

FIG. 14 shows an example of a system 1400 that includes equipment control 1404, an agent 1410 and a digital avatar 1450 that can provide for training of the agent 1410 and output of a control decision 1490.

In FIG. 14, the agent 1410 receives state information as input, as well as constraints as to the equipment control 1404, and the avatar 1450 receives contextual information and set point(s) and tuning gain(s) as input to output the state information and the control decision 1490.

The system 1400 may be implemented where an agent is to be trained for purposes of equipment control. In such a system, one or more machine learning models (ML models) may be utilized to create a digital avatar. In the system 1400, a controller component 1460 and/or a plant component 1480 may be represented by one or more ML models. As an example, a neural network can be a ML model that represents at least the plant component 1480 while the controller component 1460 may be represented using equations (e.g., a hybrid approach) or as part of the ML model (e.g., an integrated approach). As shown, the controller component 1460 can include one or more control loops, represented as P1, P2, to PN. For example, each of P1, P2, to PN can represent a setpoint where one or more of the set points, once implemented for control, can generate a desirable result, which may be represented by the plant component 1480 (e.g., using synthetic and real data).

Figure 15:
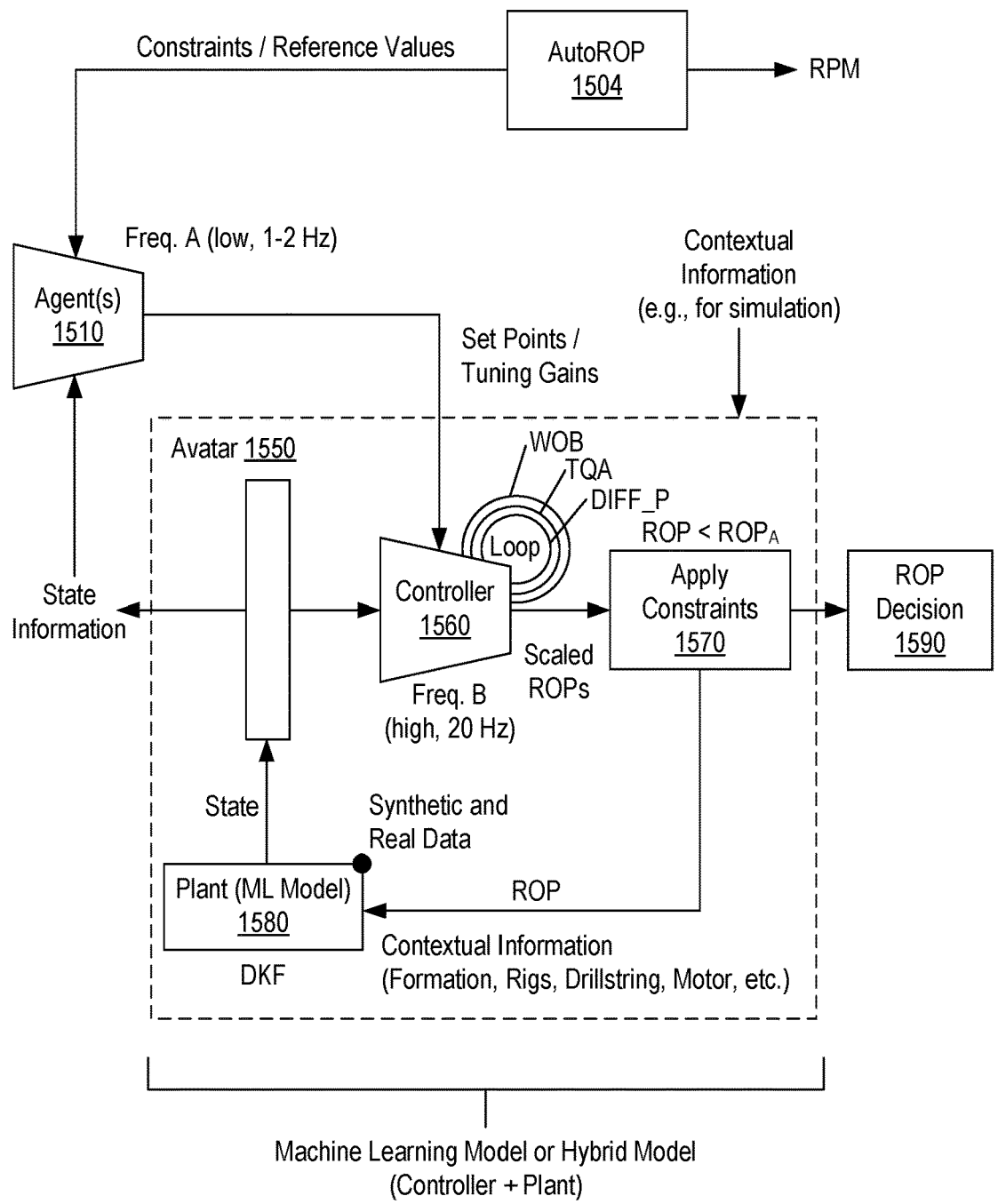
FIG. 15 illustrates an example of a system.

FIG. 15 shows an example system 1500, which can be a particular example of an implementation of the system 1400 of FIG. 14. In the example of FIG. 15, an automated ROP equipment control component 1504 can provide constraints and reference values to an agent 1510. For example, the agent 1510 can receive state information as input, as well as constraints as to the automated ROP equipment control component 1504 (e.g., an AutoROP component), and an avatar 1550 can receive contextual information and set point(s) and tuning gain(s) as input to output the state information and a control decision 1590.

In particular, the agent 1510 can receive constraints and reference values as to ROP, WOB, TQA, and DIFF_P where WOB, torque and DIFF_P can be modeled via the avatar 1550 using a controller component 1560, for example, with three loops, one for WOB, one for TQA and one for DIFF_P. The outputs of the agent 1510 can be parameter values for ROP, WOB, TQA, and DIFF_P set points along with controller tuning parameters (e.g., gains, etc.).

In the example of FIG. 15, the agent 1510 can be trained via reinforcement learning (RL) to set parameters that maximize a reward function. The agent 1510 may also receive reference values for the ROP, WOB, TQA and DIFF_P set points from the AutoROP component 1504 (e.g., or it may not).

In the example of FIG. 15, the avatar 1550 can include an autodriller logic component, shown as the controller component 1560, and a plant component 1580, which, in such an implementation, is a model that can output the physical response of a drilling system subject to contextual information and other input.

As mentioned with respect to FIG. 14, one or more ML models may be utilized for the avatar 1550 of FIG. 15. For example, the plant component 1580 can be modeled using a trained neural network model that can receive some contextual information as well as information such as drawworks speed setpoint (e.g., as output from the AutoROP component 1504) as inputs and then output various drilling quantities that define the state of the drilling behavior, referred to as the state information (e.g., values of ROP, WOB, TQA, DIFF_P, hole depth (HD), HKLD, etc.). The state information can be received by the agent 1510 as input and utilized by the agent 1510 to generate output.

In the system 1500, the agent 1510 can be trained for purposes of equipment control. In such a system, one or more machine learning models (ML models) may be utilized to create a digital avatar as the avatar 1550. In the system 1500, the controller component 1560 and/or the plant component 1580 may be represented by one or more ML models. As an example, a neural network can be a ML model that represents at least the plant component 1580 while the controller component 1560 may be represented using equations (e.g., a hybrid approach) or as part of the ML model (e.g., an integrated approach).

As an example, the avatar 1550 may be modeled using a neural network model that can act to predict states for ROP decisions in a data driven manner. Such an approach can map input to output (e.g., a state output).

As shown in FIG. 15, the avatar 1550 can include an application block 1570 for applying one or more constraints to the output of the controller component 1560, which may provide for more rational decision making. For example, consider a constraint that the output ROP (e.g., as the ROP control decision 1590) is to be less than a particular ROP (e.g., $ROP_A$). In such an example, the $ROP_A$ may be a time, equipment, formation and/or circumstance dependent upper limit. Within the avatar 1550, the application block 1570 can output an appropriate value for the plant component 1580. For example, the plant component 1580 can receive an appropriate ROP value that can be utilized in determining a state responsive to drilling at the ROP value.

In the example of FIG. 15, training may be performed with or without the AutoROP 1504. In various instances, if it is available for purposes of training, it may provide a more robust starting point (e.g., a hint or hints). As an example, an agent may be kept within AutoROP bounds such as bounds for safety and/or validity.

In the example of FIG. 15, the system 1500 can utilize synthetic data and real data for the plant component 1580, which may be modeled using a ML model with a deep Kalman filter (DKF). A DKF may be utilized for a hybrid approach or for a combined approach (e.g., a combined ML model of the plant component 1580 and the control component 1560).

The system 1500 can be utilized to generate a trained agent. For example, as information flows, the agent 1510 can be trained to generate the trained agent. Such a trained agent can be utilized in a control scenario without utilization of the avatar 1550. The avatar 1550 can make the agent 1510, as trained, a more robust agent for purposes of actual field implementation to guide drilling (e.g., ROP and ROP related control decisions). In the example of FIG. 15, the agent 1510 can be trained via reinforcement learning (RL) where there is domain adaptation through use of the digital avatar 1550.

As an example, a system may utilize a physical model such as a TORU model that is a physics-based model of a drilling system. The TORU model simulates how drilling evolves with time. Inputs to the TORU model include drillstring length and stiffness, bit-rock interaction properties, flowrate, drawworks speed setpoint, and surface RPM. The TORU model outputs include surface and bit TQA, bit ROP, bit RPM, WOB, and other quantities that describe the drilling process.

The aforementioned TORU model is "The Oilfield Rig emUlator", which is a digital model that emulates a drilling process with more or less simple models of the equipment, drillstring and down-hole physics. The TORU model is written in the PYTHON programming language and the TORU system includes an OpenAPI Specification (OAS) API, as well as a web interface that simulates a driller user-machine interface.

As shown in FIGS. 14 and 15, the avatar 1450 or the avatar 1550 may be defined as a combination of a controller and a plant, which is used to interact with the agent 1410 or the agent 1510 during the training time. As fully training an agent using an actual real-world rig can be impractical (e.g., training time, etc.), as explained, a ML model can be utilized such as a neural network model (e.g., consider a DKF) to model the plant.

Figure 16:
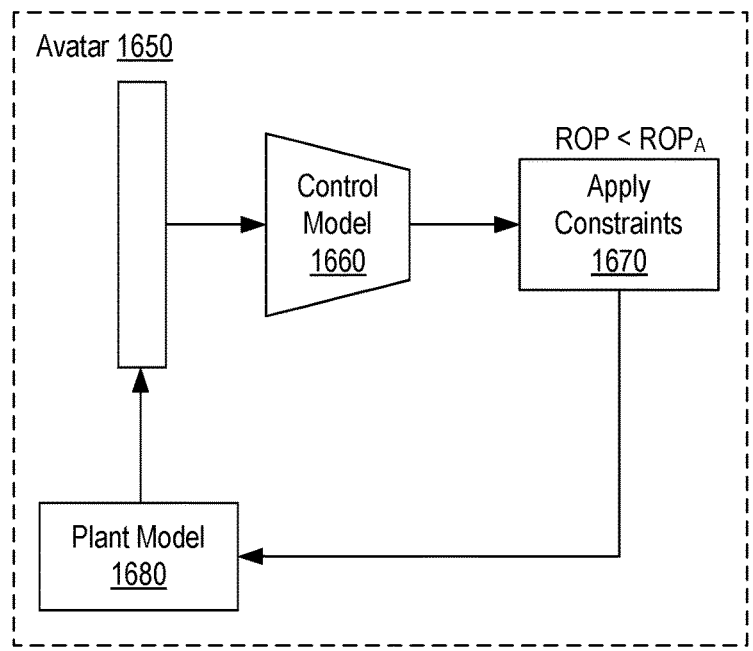
FIG. 16 illustrates examples of systems.
Figure 16:
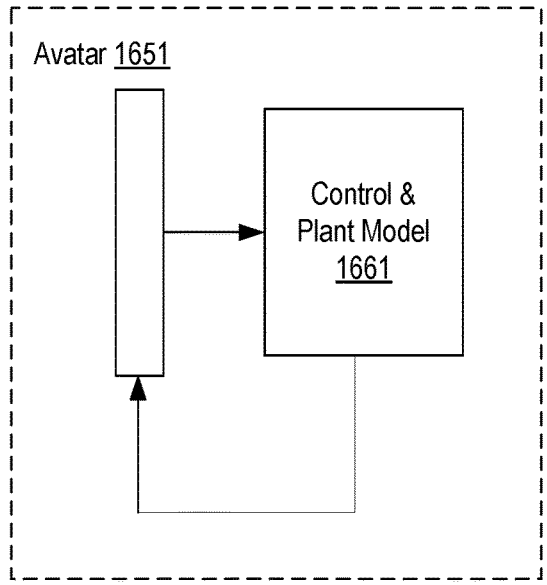

FIG. 16 shows an example system 1604 and an example system 1608 where the system 1604 includes an avatar 1650 with a control model 1660, an application block 1670 and a plant model 1680 and where the system 1608 includes an avatar 1651 with a control and plant model 1661. In FIG. 16, the system 1604 can be referred to as a hybrid approach (e.g., control model plus a plant model) and the system 1608 can be referred to as a combined approach (e.g., combined model).

As an example, dynamics of a rig drilling system can be modeled as a function G as follows:

$$G(P, E, U) \rightarrow Z$$

where P is the plant of the rig mechanical system, E is the environment (e.g., the formations, etc.), U is the rig controls and Z is the measurement. The pair (P, E) can be treated as hidden state (X) for the rig drilling system, and U and Z can be the input and output, correspondingly.

Figure 17:
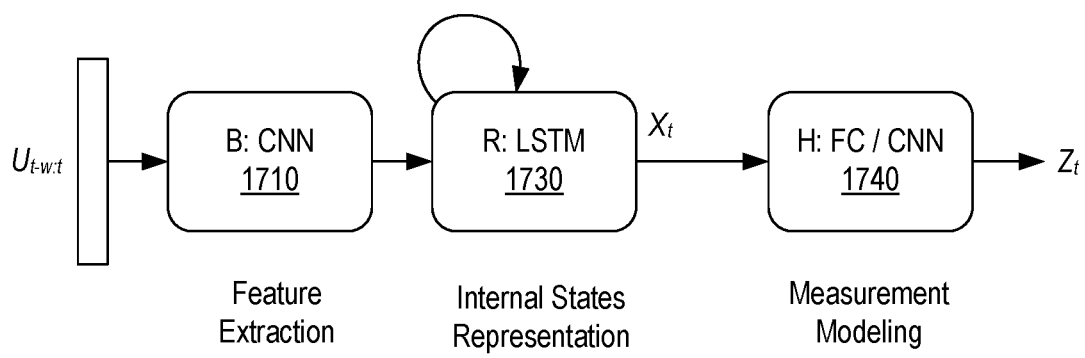
FIG. 17 illustrates an example of a machine learning model.

FIG. 17 shows an example of a machine learning model (ML model) 1700 that includes a neural network as a deep Kalman filter (DKF). As shown, the ML model 1700 includes a convolutional neural network (CNN) component for feature extraction 1710, long short-term memory (LSTM) component for internal states representations 1730 and a fully connected layers (FC) component and/or a convolutional neural network (CNN) component for measurement modeling 1740. In the example of FIG. 17, B can be a transfer function and H can be a transfer function.

The aforementioned dynamics function G can be described with a non-linear Kalman filter. The Kalman filter includes components of internal states, inputs, measurements, and transfer functions for the internal states, inputs, and measurements:

$$X_{t+1} \leftarrow F(X_t) + B(U_t) + w_t$$

$$Z_{t+1} \leftarrow H(X_{t+1}) + v_t$$

where U is the input, X is the hidden state of the system (or the P, E pair), Z is the output or measurements, w and v are noise, F, B, and H are transfer functions, specifically B is the transfer function from input to internal state, F is the hidden state transfer function, and H is the transfer function for the output from the internal state.

Dynamics can also be defined in a more general form as the control mode, which explicitly takes some channels as input, and predicts other channels. The output channels can be predicted response channels in a regression task, or class labels in a classification task:

$$X_t \leftarrow F(X_{t-1}) + B(I_{t-w:t})$$

$$Z_{t+1} \leftarrow H(X_t)$$

where I is a windowed input (e.g., over a window in time), from sample t-w to t, Z is the channels to predict (or it can be a set of class labels in classification tasks), X is the hidden states and F, B, and H are transfer functions as previously defined.

Above, note that the hidden states X can be complex as they represent the environment and the plant. Unlike the goal of a Kalman filter trying to find the hidden state X, a system can be focused on predicting the output Z from the input U. Hence, an approach can aim to find the transfer functions F, B, and H.

As a neural network model can be implemented as a universal function approximator, transfer functions can be modeled using deep neural networks. Where one or more deep neural networks are utilized, an architecture can be referred to as a Deep Kalman filter (DKF) as explained with respect to the ML model 1700 of FIG. 17.

As explained, a deep neural network model can include components of convolutional neural network layers (CNN) as the feature extractor (see, e.g., transfer function B) and the transfer function F and a delay block can be combined as a recurrent component R and implemented with a long short-term memory layer (LSTM). For the transfer function H, the model may use feedforward layers, which can include fully-connected layers (FC) or deconvolutional layers (CNN).

Figure 18:
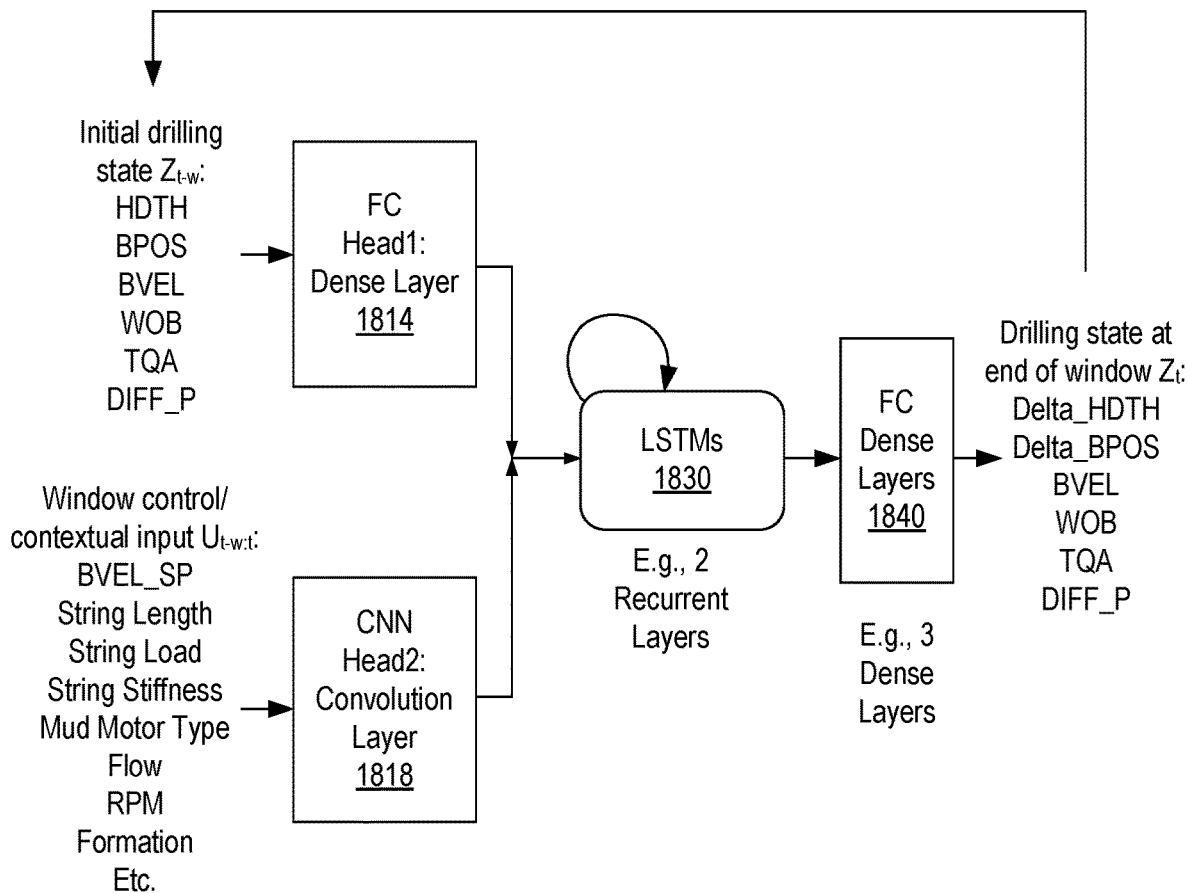
FIG. 18 illustrates an example of a method.

FIG. 18 shows an example of a method 1800 for an architecture of an avatar that includes two network heads 1814 and 1818 followed by an LSTMs component 1830 and an FC dense layer(s) component 1840. In the example of FIG. 18, the head 1814 can be a FC layer of approximately 64 units and receive, as input, a drilling state at time t, which is the start of a time window of length w, and the head 1818 can include, for example, two CNNs with 64 units each and receive, as input, control and context information over the window of length w. The outputs of the two heads 1814 and 1818 can be concatenated before they are fed into, for example, two LSTM layers (e.g., consider a first LSTM that includes approximately 512 units and second LSTM that includes approximately 64 units). In the example of FIG. 18, three FC layers can follow the LSTMs where, for example, a first FC includes approximately 512 units, a second FC includes approximately 256 units and a third FC includes approximately 5 units.

As mentioned with respect to FIG. 16, the system 1604 includes two models while the system 1608 includes a single, combined model, which may be a data-driven model. The system 1608 demands data for training of the model. As an example, training can utilize data from one or more sources. For example, consider utilizing data generated from physics-based model (e.g., TORU model) scenarios and/or data from actual field operations.

For a physics-based model approach, a method can include generating training scenarios to attempt to capture relevant potential drilling situations. In such an approach, a main input to a neural network can be the drawworks speed setpoint, with other parameters that define a system response (e.g., drillstring length and stiffness, bit-rock interaction properties, flowrate, and surface RPM). In such an approach, scenario data can be generated by repeatedly running the TORU model over a wide range of values for the aforementioned parameters where the resulting simulation data (e.g., TORU model-based data, etc.) are stored for use in training.

As an example, data generated using the TORU model can be at a controller sample rate, which may be, for example, approximately 50 Hz. Such an approach can result in a relatively large amount of data, which can be more than feasible for purposes of training. In such an approach, a method can include downsampling. For example, consider a method that includes downsampling of TORU model generated data at a rate that is selected to be sufficient to preserve information for purposes of training. Referring again to the AutoROP system 1500 of FIG. 15, the controller component 1560 is shown as having a corresponding frequency B while the agent 1510 is shown as having a corresponding frequency A where the frequency A (e.g., approximately one to a few Hz) can be less than the frequency B (e.g., approximately 20 Hz or more).

In a downsampling method, after downsampling the data, the downsampled data can be processed to obtain the following entities: drawworks speed setpoint (BVEL_SP), formation, drillstring length and stiffness and load, RPM, Flow, Mud Motor Type, Hole Depth (HD or HDTH), Block Position (BPOS), surface Wight On Bit (WOB), surface torque (TQA), block speed (BVEL), differential pressure (DIFF_P), delta_HDTH and delta_BPOS. Such entities, which are provided as examples, can be referred to as processed input data that can be normalized before feeding to an avatar network for training. As shown in the method 1800, the processed input data, as normalized, can be input to the second head 1818.

As shown in the example method 1800 of FIG. 18, the drilling state is fed to the first head 1814. In such an example, control inputs set by a PI controller (BVEL_SP) and by a driller (RPM, flow) and contextual input like the string length, formation, etc., can be fed to the second head 1818. As explained, a method for training can utilize a training dataset that is randomly sampled from data generated via a TORU model (e.g., a physics-based model). As an example, for each training dataset, a method can generate training samples, which are pairs of input/output (input: $(Z_{t-w}, U_{t-w:t})$, output; $(Z_t)$). As an example, training can utilize an adaptive moment estimation (Adam) optimizer with the Huber loss function (e.g., or a variant thereof, such as, a pseudo-Huber loss function, etc.).

The Adam optimizer or optimization routine is an update to the RMSProp optimizer. The Adam optimizer can provide for running averages of both the gradients and the second moments of the gradients. The Huber loss function describes the penalty incurred by an estimation procedure. The Huber loss function is generally defined piecewise. The Huber loss is a loss function that can be used in robust regression that tends to be less sensitive to outliers in data than the squared error loss.

In the example of FIG. 18, once the ML model is trained to generate a trained ML model, the trained ML model can be utilized as a simulator for simulating drilling. For example, the trained ML model can be utilized in a prediction mode where it receives input and generates output as a prediction. In such an example, the output can be the drilling state, which can be fed back to the first head 1814 as shown in FIG. 18.

As explained, the method 1800 of FIG. 18 can utilize downsampled data for training. Referring again to the example system 1500 of FIG. 16, to run the AutoROP component 1504 in a loop with the avatar 1550, the ML model can be run to make predictions at a higher frequency (e.g., at a controller sampling rate).

Figure 19:
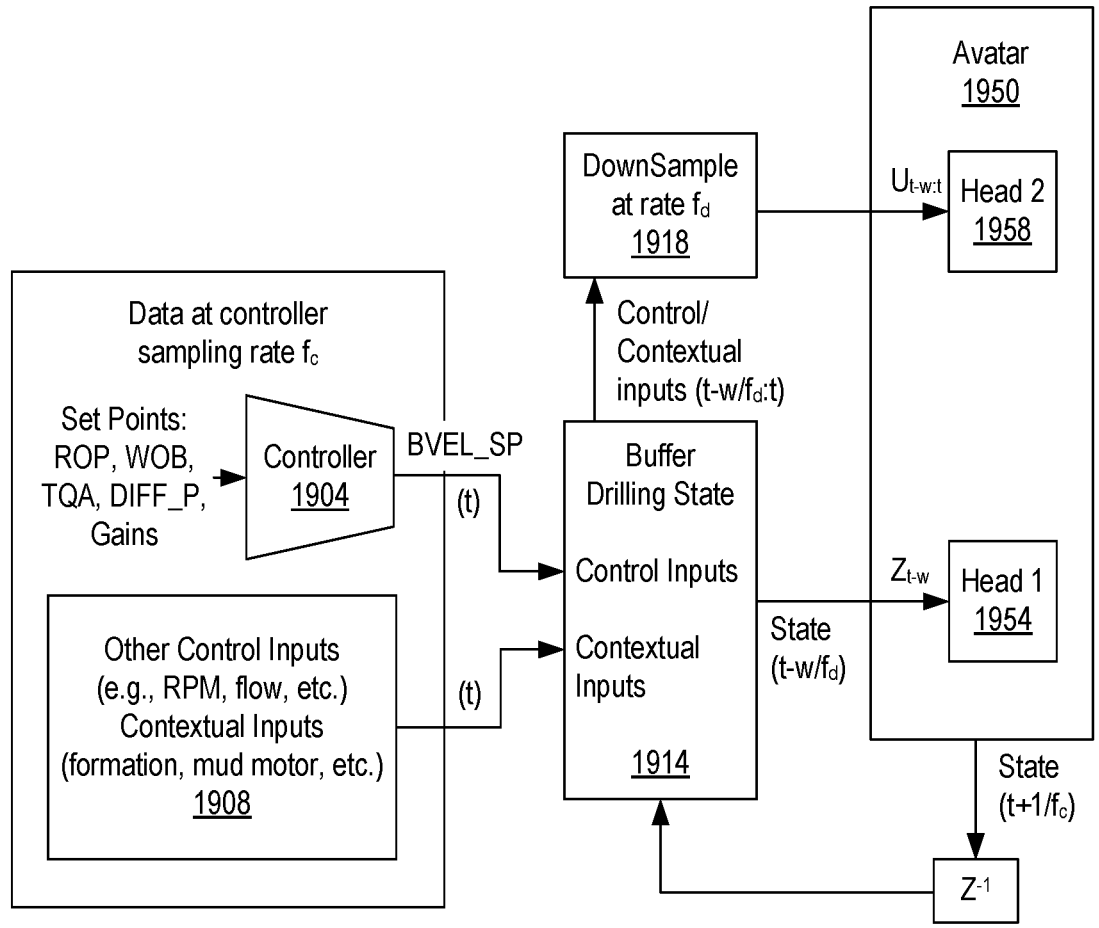
FIG. 19 illustrates an example of a method.

FIG. 19 shows an example of a method 1900 that includes a controller 1904 for control input and other control input 1908, a buffer 1914, a downsampler 1918, an avatar 1950 with a first head 1954 and a second head 1958.

In the example of FIG. 19, the method 1900 can run the avatar 1950 prediction at the controller sample rate ($f_c$), when the network is trained at a lower frequency ($f_d$). In the method 1900, U is the downsampled control and contextual input to the avatar 1950 and Z is the downsampled drilling state input to the avatar 1950.

Figure 20:
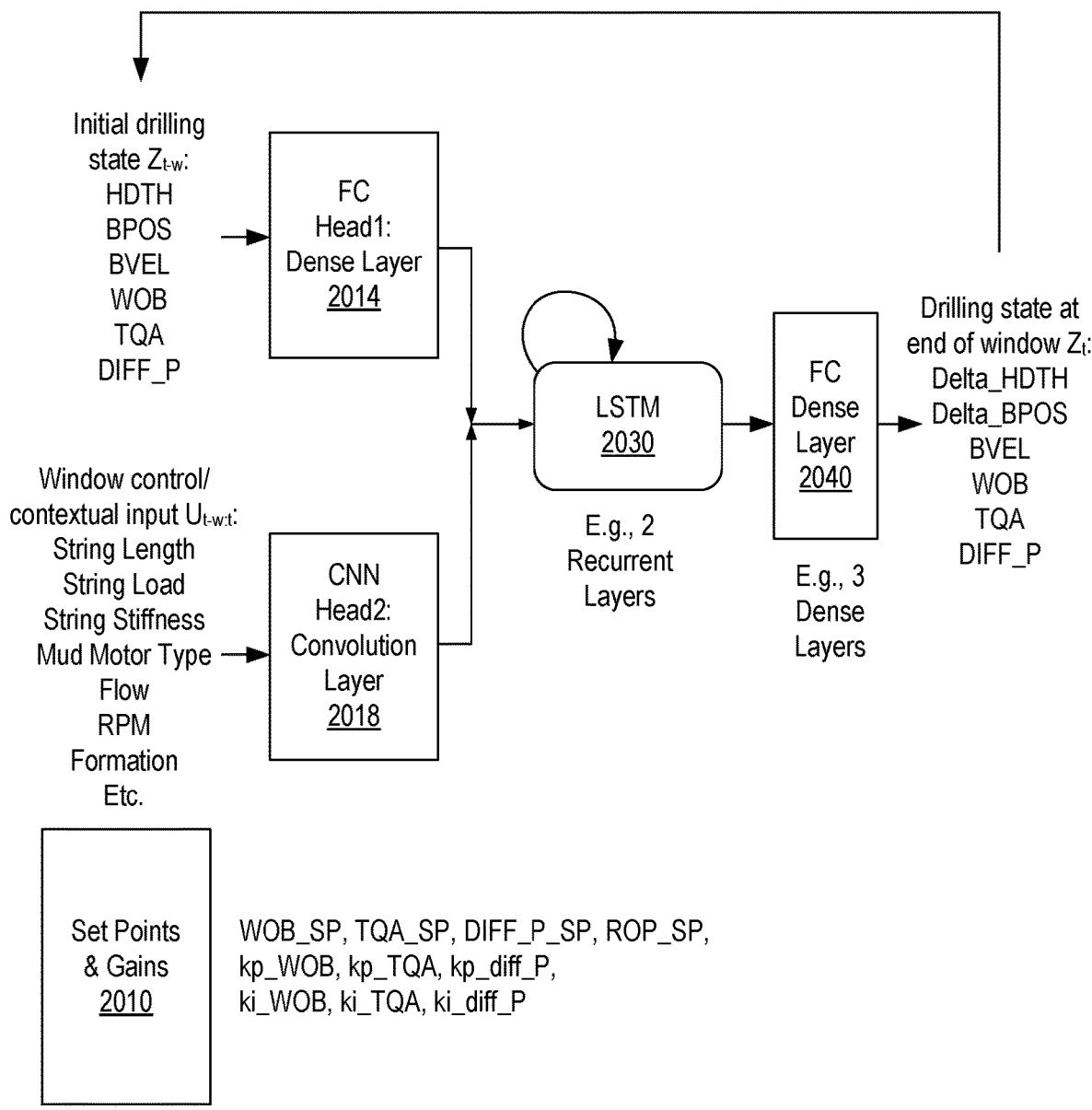
FIG. 20 illustrates an example of a method.

FIG. 20 shows an example of a method 2000 that is akin to the method 1800 of FIG. 18 though, instead of feeding the BVEL_SP to a second head 2018, the method 2000 feeds the autodriller gains and set points (WOB, TQA, DIFF_P, ROP) per the set points and gains block 2010. As shown, the method 2000 can utilize an architecture with a first head 2014, the second head 2018, an LSTMs component 2030 and a FC component 2040. Such features can be akin to those described with respect to the method 1800 of FIG. 18.

As to the method 2000, the set points and gains block 2010 can provide control input to the second head 2018 that include auto-driller input set points and kp and ki, which refer respectively to auto-driller proportional and integral gains (e.g., for a PI controller implementation).

Figure 21:
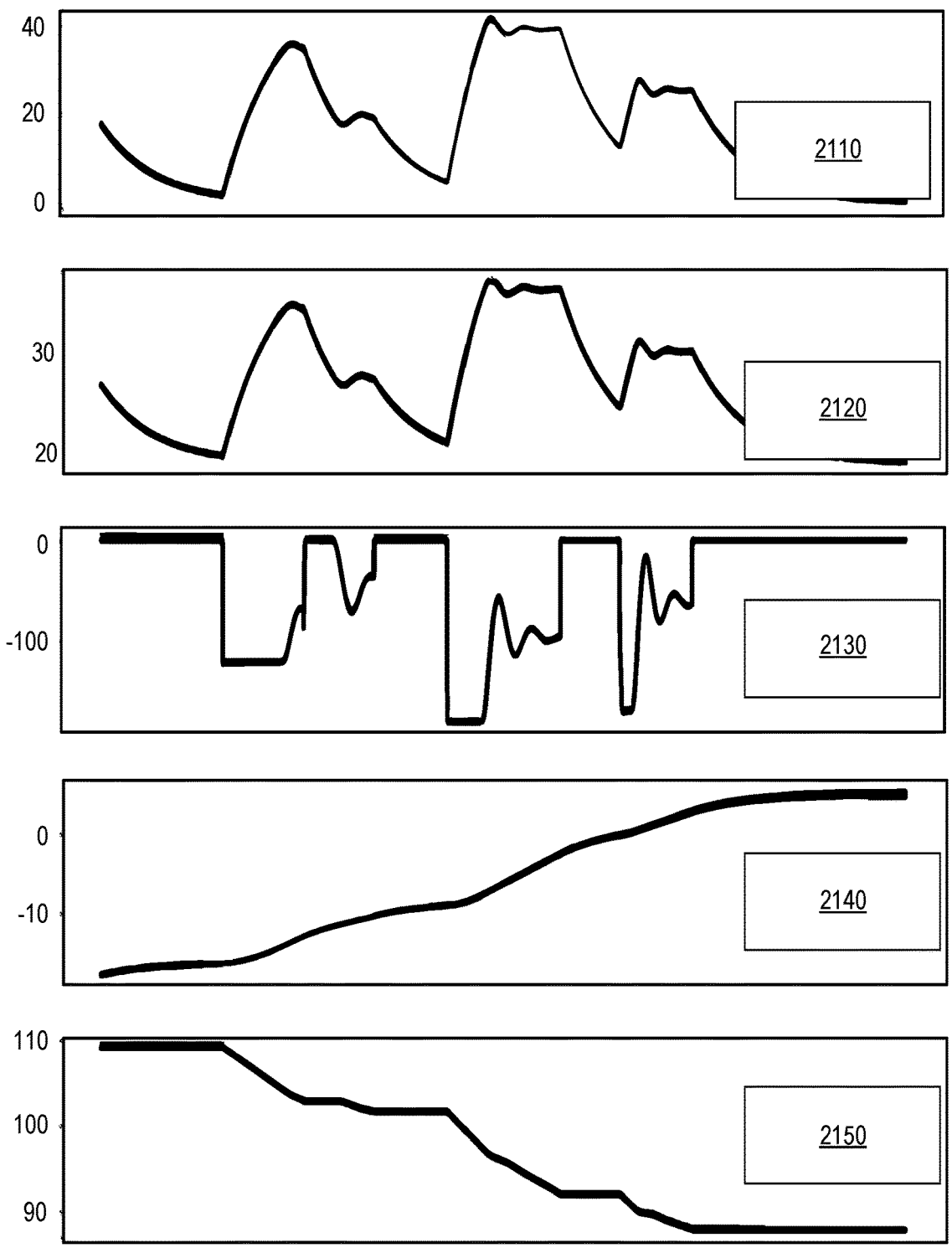
FIG. 21 illustrates examples of plots.

FIG. 21 shows a series of plots 2110, 2120, 2130, 2140 and 2150 of prediction results from a trained ML model trained as in the method 1800 of FIG. 18. The particular equipment specified did not include a mud motor and the Huber loss value was set at 1e-5. In FIG. 21, the thickness of the lines represents a span between the actual values from the TORU model and predicted values from the trained ML model, noting that no substantial deviations resulted between the actual values and predicted values (e.g., substantial overlap exists for values of the training data scenarios and the predictions). In FIG. 21, the plot 2110 is for surface weight on bit (SWOB, klbf), the plot 2120 is for torque (TQA, kNm), the plot 2130 is for block velocity (BVEL, ft/h), the plot 2140 is for hole depth (HDTH, ft) and the plot 2150 is for block position (BPOS, ft).

As explained, data from actual drilling operations may be utilized alternatively and/or additionally for ML model training (e.g., data akin to that of the TORU model simulations).

As an example, a method can include training an avatar (e.g., a digital avatar) to generate a trained avatar (e.g., a trained digital avatar) and then training an agent (e.g., a ML model) using the trained avatar to generate a trained agent. In such an example, the trained agent can be utilized in drilling, for example, to control drilling, supplement control of drilling, etc. As an example, a trained avatar can generate one or more autodriller parameter values, for example, as to an appropriate ROP, which may be subject to one or more constraints, goals, etc. As an example, a method for training an agent can utilize one or more reward functions, which may characterize one or more constraints, goals, etc.

As an example, after developing a robust avatar, an agent can be trained to optimally set autodriller parameters. In such an example, the agent can be trained using feedback on the drilling behavior that results from the set of autodriller parameters. As explained with respect to the system 1300 of FIG. 13, a reward can be generated using the reward calculator 1370 that can be based on a reward function and information output by the simulator 1350 (e.g., a state or state information), which can be simulated output of an environment, a plant, etc., responsive to taking one or more actions as may be output by the agent 1310. Thus, a reward is a type of feedback, which may be defined using a reward function.

Given the nature of a drilling system, response to a given set of parameters can be determined via physical phenomena such as, for example, a bit crushing rock during drilling, movement of heavy equipment (e.g., a drillstring), etc. In such a drilling system, the response to a control action can be relatively slow, which may be on the order of ten seconds or more. Additionally, some amount of time may be taken for quantifying a response (e.g., as may be based on various types of data, sensor measurements, etc.).

Figure 22:
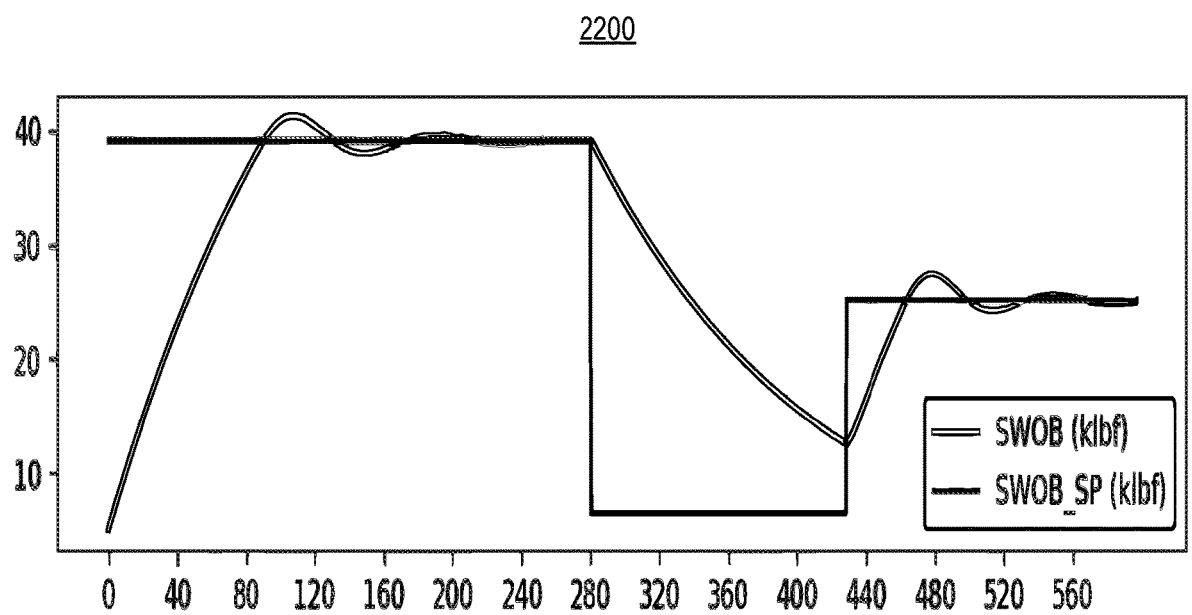
FIG. 22 illustrates an example of a plot.

FIG. 22 shows an example of a plot 2200 of surface weight on bit (SWOB, klbf) versus time in seconds for a change in a setpoint as to the surface weight on bit (SWOB_SP). As seen, the actual SWOB can exhibit a lag with some amount of overshoot and/or undershoot (e.g., consider oscillation, etc.) when settling in on a set point value.

As to a reward function definition, a reward function can provide for quantifying observable parameters. A reward function can be defined to output higher values for positive drilling behavior and lower values for poor or negative drilling behavior (e.g., consider beneficial, desirable, etc., versus less beneficial, less desirable, etc.). Some of the types of behaviors that can be rewarded can include: high drilling speed (e.g., an operator would like to drill as fast as possible in order to complete a job quickly); smooth drilling (e.g., an operator would like to limit fluctuations in drilling quantities such as ROP, WOB, TQA, and DIFF_P); and respect for limits/constraints (e.g., an operator does not want to exceed certain limits placed on drilling quantities).

Below, an example of a reward function is provided:

$$R = C_1 \frac{ROP_{ave}}{ROP_{lim}} - C_2 \frac{ROP_{sd}}{ROP_{ave}} - C_3 \frac{WOB_{sd}}{WOB_{ave}} - C_4 \frac{TQA_{sd}}{Torq_{ave}} -$$

$$C_5 \frac{DIFF\_P_{sd}}{DIFF\_P_{ave}} - C_6 \% ROP - C_7 \% WOB - C_8 \% DIFF\_P - C_9 \% TQA$$

In the foregoing reward function, the coefficients $C_1$ to $C_9$ can give relative weights to the different terms. As shown, the first term is the average drilling rate of penetration divided by the ROP limit. This term is positive to encourage higher ROP. The second through the fifth terms are the standard deviations of the ROP, WOB, TQA, and DIFF_P, divided by the average values of these quantities. As an example, these terms could instead be divided by the setpoint/limit values of these quantities. As an example, one or more quantities may be filtered (e.g., high-pass filtered) before a standard deviation is calculated. In the example reward function, the second to fifth terms are negative to penalize large variations in these quantities. The last four terms, the sixth to the ninth, are the percentage of time the given parameter is above the parameter setpoint value. These are also negative, to penalize exceeding the set points.

As an example, a reward function can be dependent on one or more conditions. For example, consider depth where, at different depths of a given bore trajectory, different reward functions may be used. For example, one may reward respecting limits and smooth drilling may be utilized early in a bit run, to ensure that there will not be premature bit wear/downhole tool fatigue failures. Later in the run, an operator may value drilling speed more highly. As an example, a method can include utilization of multiple agents. For example, different agents may be trained to behave in different, predetermined ways to allow to optimization of overall drilling performance. Such an approach may be performed to achieve different performance based on a particular client preference (e.g., Agent A can be trained to reward behavior as preferred by Client A, while Agent B is trained to reward behavior preferred by Client B). Such differentiation in behavior can be achieved, for example, by varying the coefficients in the terms of the aforementioned reward function or by utilizing different reward functions, etc.

For training an agent, a reward function will likely be calculated at a set period of time after the agent adjusts some drilling parameters, which is due to the fact that the drilling system will have a fast transient response followed by a longer term steady-state response. Under such circumstances, a method for training can include: an agent setting parameters; waiting a period of time (e.g., on the order of tens of seconds); and evaluating a reward function for the wait period.

As an example, a period of time over which the reward function is evaluated may be of the order of 10 s of seconds or even minutes, which can be due to the fact that the drilling system response occurs over such a timeframe; thus, to effectively evaluate a set of parameters, a time response (e.g., characteristic time, lag time, etc.) can be determined by knowledge of the drilling system (e.g., as a relevant timescale).

Figure 23:
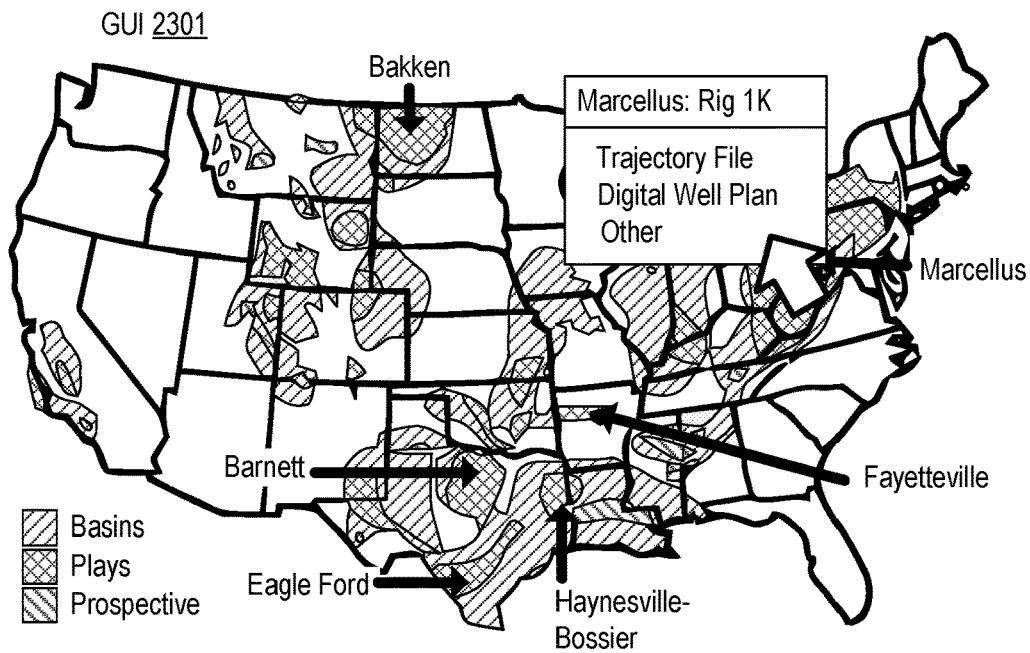
FIG. 23 illustrates an example of a system.
Figure 23:
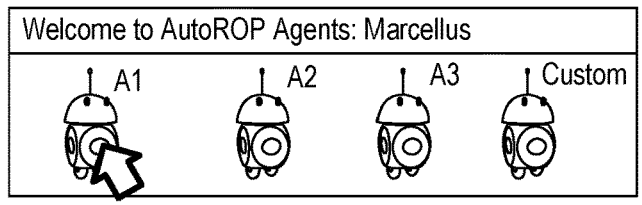

FIG. 23 shows an example of a system 2300 that includes various graphical user interfaces (GUIs) 2301, 2302 and 2303. As shown, the GUI 2301 can include a geographic map with various labeled regions such as basins, plays, and prospective plays. In such an example, a graphic control can be utilized to select a region and, for example, a rig or rigsite in the region. As shown, a graphical control is utilized to render another graphical control with information and menu items such as trajectory file, digital well plan, and other. As an example, upon receipt of a command responsive to input (e.g., a mouse click, a hover, a touch, a stylus position, a voice command, etc.), the system 2300 can access a database that includes information as to various agents where such the system 2300 can select one or more agents, optionally ranking them, for use with a project such as, for example, a particular Marcellus rig at a rigsite in the Marcellus basin. In such an example, the system 2300 can tailor the selection or selections using data about the rig, the play, drillstring equipment, etc.

In the example of FIG. 23, the GUI 2302 shows various AutoROP agents. Upon receipt of an instruction responsive to selection of one of the agents, the GUI 2303 may be rendered to a display, where various details about the selected agent can be seen. For example, consider details about activity (e.g., where an instance of the agent may be currently in use), personal (e.g., how trained, when trained, trained for what conditions, etc.), experience (e.g., past use, whether simulated and/or real), expertise (e.g., types of equipment, types of formations, types of dogleg severities, etc.), and professional (e.g., associated resources that may be available through one or more service providers, etc.).

As shown, such a system can facilitate decision making, planning, drilling, etc., in one or more regions. After selection of an agent, or agents, equipment at a rigsite can be operatively coupled to computational resources for execution of the agent or agents. In such an example, the agent or agents may generate control instructions suitable for automated, semi-automated and/or manual control of one or more drilling operations. As an example, consider the system 470 of FIG. 4 being operatively coupled to one or more agents for purposes of drilling a borehole at least in part according to a planned trajectory of a digital well plan.

As an example, a system may include a computational framework that can utilize a Representational State Transfer (REST) API, which is of a style that defines a set of constraints to be used for creating web services. Web services that conform to the REST architectural style, termed RESTful web services, provide interoperability between computer systems on the Internet. RESTful web services can allow one or more requesting systems to access and manipulate textual representations of web resources by using a uniform and predefined set of stateless operations. One or more other kinds of web services may be utilized (e.g., such as SOAP web services) that may expose their own sets of operations.

As an example, a computational controller operatively coupled to equipment at a rigsite (e.g., a wellsite, etc.) can utilize one or more APIs to interact with a computational framework that includes an agent or agents. In such an example, one or more calls may be made where, in response, one or more actions are provided (e.g., control actions for drilling). In such an example, a call may be made with various types of data (e.g., observables, etc.) and a response can depend at least in part on such data. For example, observables may be transmitted and utilized by an agent to infer a state where an action is generated based at least in part on the inferred state and where the action can be transmitted and utilized by a controller to control drilling at a rigsite.

Figure 24:
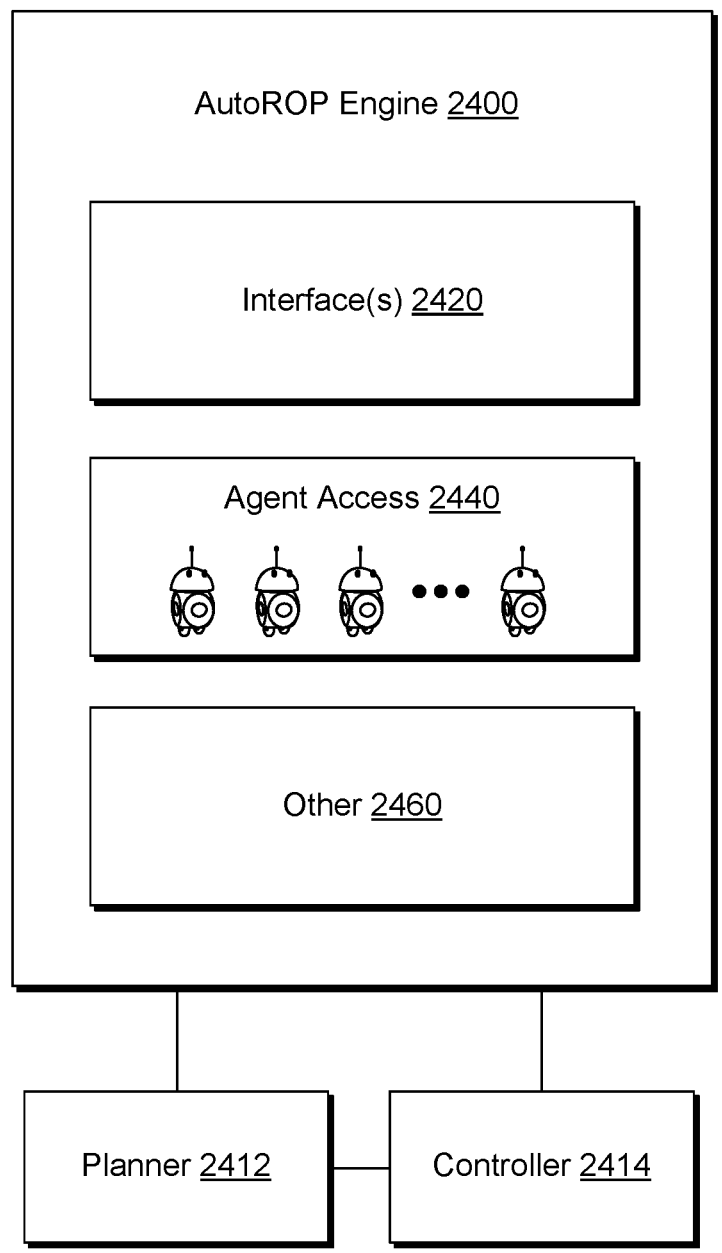
FIG. 24 illustrates an example of an engine.

FIG. 24 shows an example of an AutoROP engine 2400. As shown, the AutoROP engine 2400 can include one or more interfaces 2420, an agent access component 2440 and one or more other components 2460. As shown, the AutoROP engine 2400 can be operatively coupled to a planning component or system 2412 and/or a control component or system 2414 (e.g., a drill control framework, etc.). As an example, the one or more interfaces 2420 can be or include one or more application programming interfaces (APIs) where one or more calls may be made such that the AutoROP engine 2400 performs some action, which may be for purposes of planning and/or control. As an example, a call may come from one or more of the planning component or system 2412 and the control component or system 2414. As an example, a driller may utilize a computing device to make a call, which may return ROP information.

Figure 25:
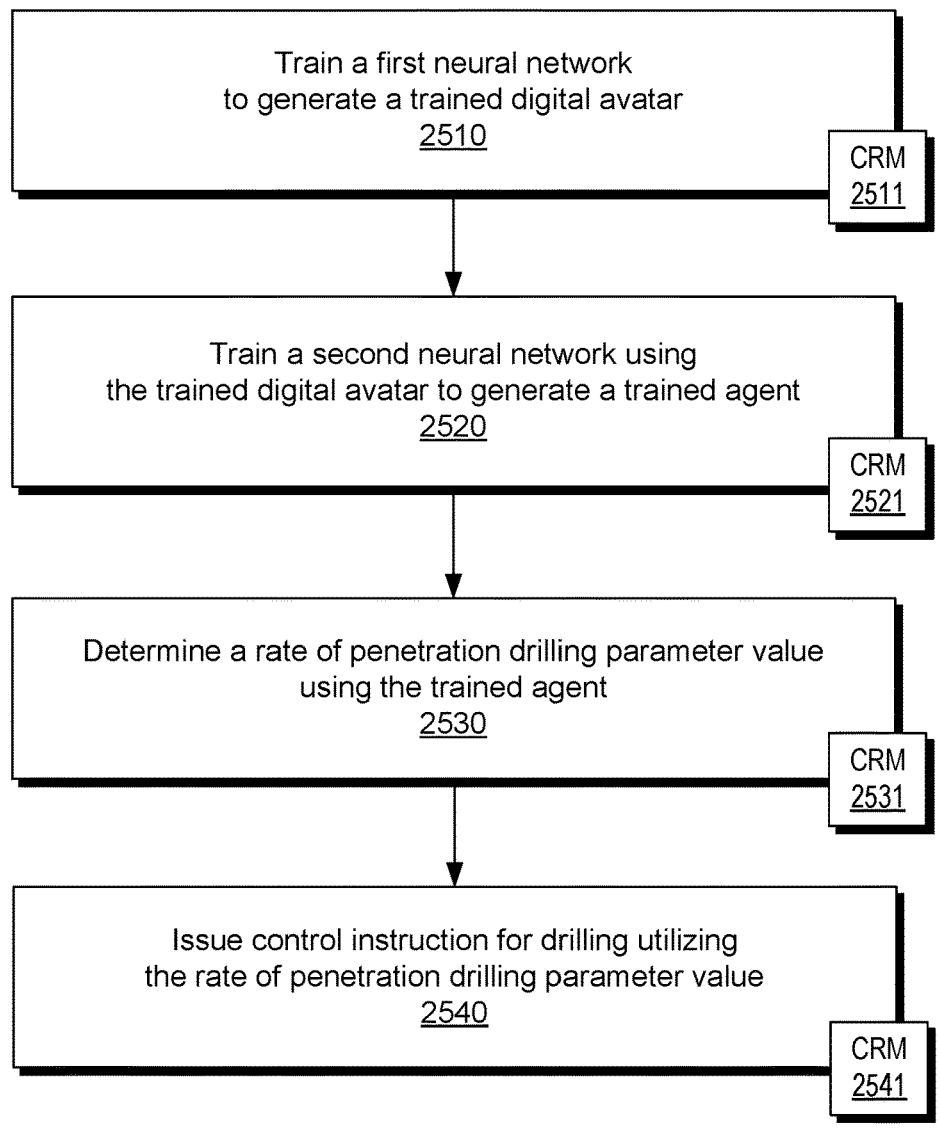
FIG. 25 illustrates an example of a method and an example of a system.

FIG. 25 shows an example of a method 2500 and an example of a system 2590. As shown, the method 2500 includes a training block 2510 for training a first neural network to generate a trained digital avatar, a training block 2520 for training a second neural network using the trained digital avatar to generate a trained agent, a determination block 2530 for determining a rate of penetration drilling parameter value using the trained agent, and a control block 2540 for issuing a control instruction for drilling utilizing the rate of penetration drilling parameter value.

The method 2500 is shown as including various computer-readable storage medium (CRM) blocks 2511, 2521, 2531 and 2541 that can include processor-executable instructions that can instruct a computing system, which can be a control system, to perform one or more of the actions described with respect to the method 2500.

In the example of FIG. 25, the system 2590 includes one or more information storage devices 2591, one or more computers 2592, one or more networks 2595 and instructions 2596. As to the one or more computers 2592, each computer may include one or more processors (e.g., or processing cores) 2593 and memory 2594 for storing the instructions 2596, for example, executable by at least one of the one or more processors 2593 (see, e.g., the blocks 2511, 2521, 2531 and 2541). As an example, a computer may include one or more network interfaces (e.g., wired or wireless), one or more graphics cards, a display interface (e.g., wired or wireless), etc.

Figure 26:
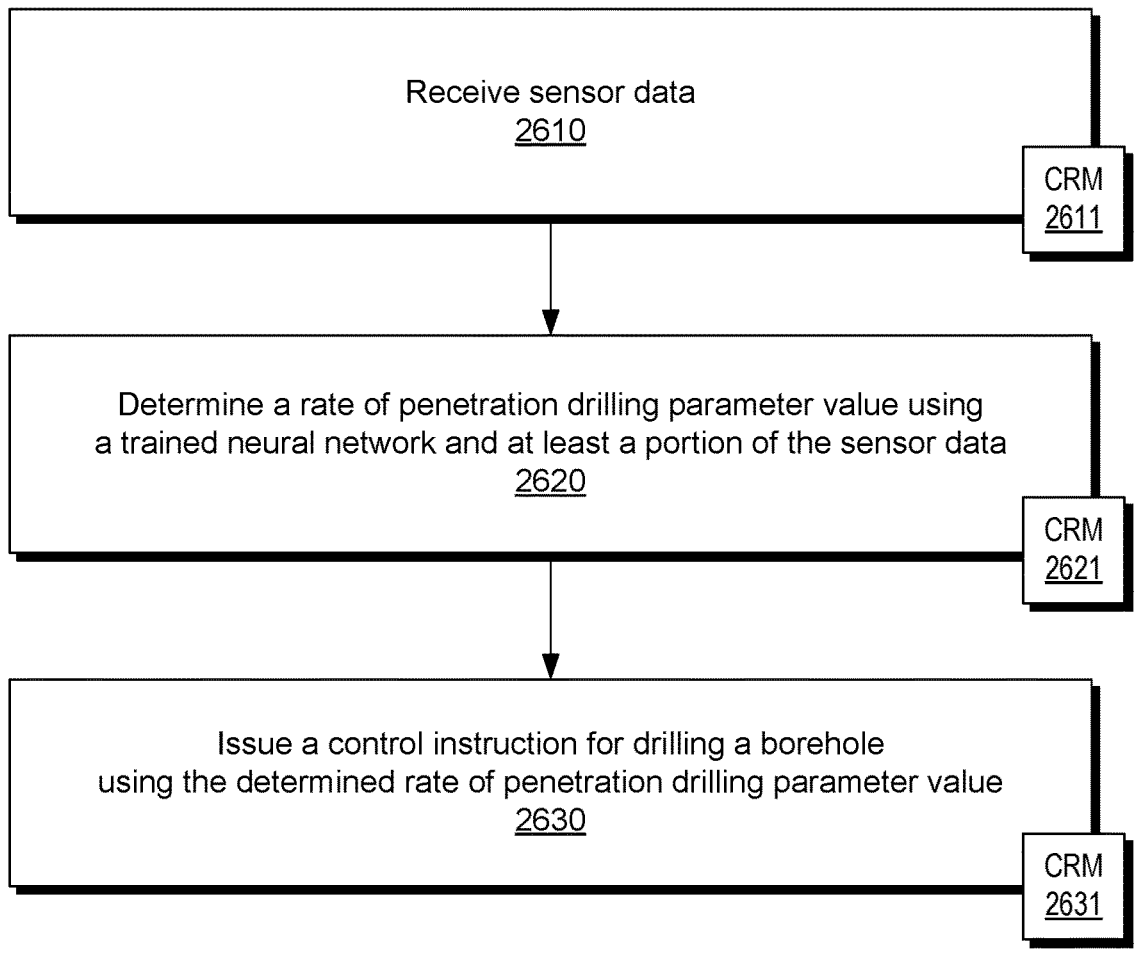
FIG. 26 illustrates an example of a method and an example of a system.
Figure 26:
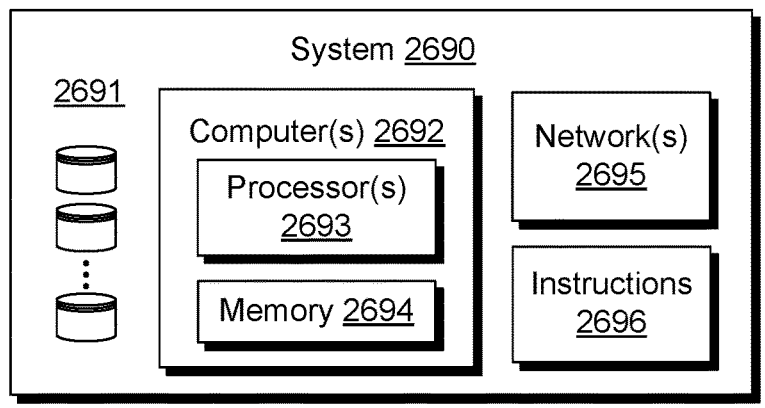

FIG. 26 shows an example of a method 2600 and an example of a system 2690. As shown, the method 2600 includes a reception block 2610 for receiving sensor data during drilling of a portion of a borehole in a geologic environment; a determination block 2620 for determining a drilling mode from a plurality of drilling modes using a trained neural network and at least a portion of the sensor data; and an issuance block 2630 for issuing a control instruction for drilling an additional portion of the borehole using the determined drilling mode.

The method 2600 is shown as including various computer-readable storage medium (CRM) blocks 2611, 2621 and 2631 that can include processor-executable instructions that can instruct a computing system, which can be a control system, to perform one or more of the actions described with respect to the method 2600.

In the example of FIG. 26, the system 2690 includes one or more information storage devices 2691, one or more computers 2692, one or more networks 2695 and instructions 2696. As to the one or more computers 2692, each computer may include one or more processors (e.g., or processing cores) 2693 and memory 2694 for storing the instructions 2696, for example, executable by at least one of the one or more processors 2693 (see, e.g., the blocks 2611, 2621 and 2631). As an example, a computer may include one or more network interfaces (e.g., wired or wireless), one or more graphics cards, a display interface (e.g., wired or wireless), etc.

As an example, the method 2500 and/or the method 2600 may be a workflow that can be implemented using one or more frameworks that may be within a framework environment. As an example, the system 2590 and/or the system 2690 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

Figure 27:
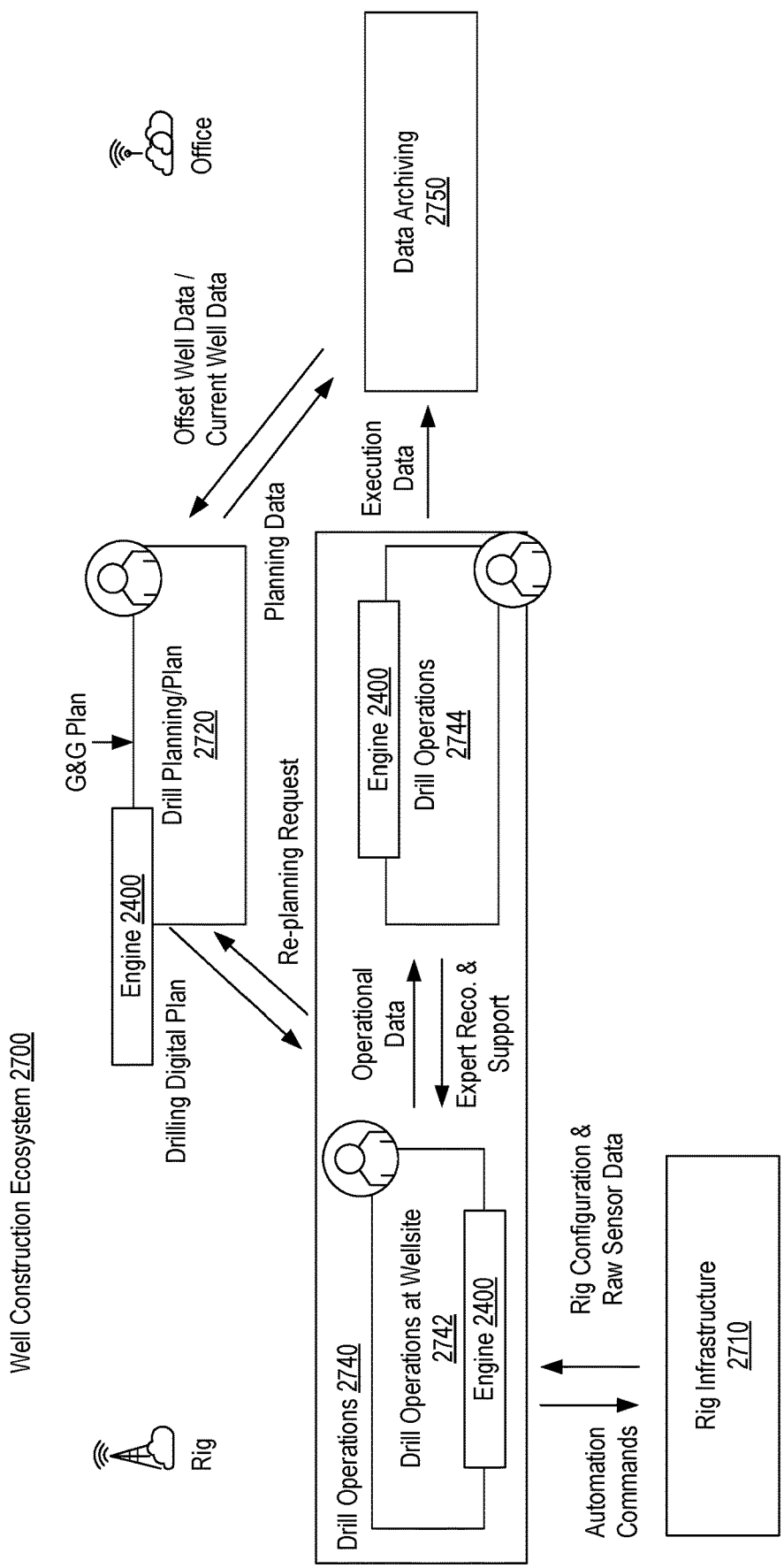
FIG. 27 illustrates an example of a system.

FIG. 27 shows an example of a system 2700 that can be a well construction ecosystem. As shown, the system 2700 can include one or more instances of the engine 2400 (e.g., the AutoROP engine) and can include a rig infrastructure 2710 and a drill plan component 2720 that can generate or otherwise transmit information associated with a plan to be executed utilizing the rig infrastructure 2710, for example, via a drilling operations layer 2740, which includes a wellsite component 2742 and an offsite component 2744. As shown, data acquired and/or generated by the drilling operations layer 2740 can be transmitted to a data archiving component 2750, which may be utilized, for example, for purposes of planning one or more operations (e.g., per the drilling plan component 2720).

In the example of FIG. 27, the engine 2400 is shown as being implemented with respect to the drill plan component 2720, the wellsite component 2742 and/or the offsite component 2744.

As an example, the engine 2400 can interact with one or more of the components in the system 2700. As shown, the engine 2400 can be utilized in conjunction with the drill plan component 2720. In such an example, data accessed from the data archiving component 2750 may be utilized to assess output of the engine 2400 or, for example, may be utilized as input to the engine 2400. As an example, the data archiving component 2750 can include drilling data for one or more offset wells and/or one or more current wells pertaining to specifications for and/or operations of one or more types of bits, etc.

As shown in FIG. 27, various components of the drilling operations layer 2740 may utilize the engine 2400 and/or a drilling digital plan as output by the drill plan component 2720. During drilling, execution data can be acquired, which may be utilized by the engine 2400. Such execution data can be archived in the data archiving component 2750, which may be archived during one or more drill operations and may be available by the drill plan component 2720, for example, for re-planning, etc.

As an example, the system 2700 may be utilized for purposes of reward definition, reward adjustment, etc. As an example, the system 2700 may be utilized for purposes of one or more safety constraints (e.g., formulation, adjustment, etc., of a safety constraint, etc.).

As an example, a method may be implemented in part using computer-readable media (CRM), for example, as a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

As an example, a method can include receiving sensor data; determining a rate of penetration drilling parameter value using a trained neural network and at least a portion of the sensor data; and issuing a control instruction for drilling a borehole using the determined rate of penetration drilling parameter value. In such an example, the rate of penetration drilling parameter value can be a set point value, for example, consider a weight on bit value, a torque value, a pressure value or a rate of penetration value. As explained, an agent can be a trained machine learning model such as a trained neural network model that can operate responsive to one or more inputs. For example, consider one or more inputs relating to a state of a physical system, which can include equipment and features of an environment (e.g., rock, fluid, etc.). In such an example, the agent can output one or more values, which can include one or more set point values, one or more controller tuning parameter values, etc. As explained, an agent can be utilized to facilitate operation of an autodriller system such as, for example, an automated rate of penetration optimization system, by providing such output or outputs as input or inputs to the autodriller system. Such an agent can recommend, augment and/or substitute, at least in part, human input or inputs to an autodriller system. As explained, a trained agent may understand behaviors of drilling operations controllable by an autodriller system better than an operator, particularly where the operator has limited experience with equipment, an environment, operation of the autodriller system, etc. For example, rather than a human operator providing set point values and controller tuning parameter values to an autodriller system, a trained agent may do so.

As an example, an agent (e.g., a trained agent) can receive state information as input, as well as constraints on ROP, WOB, TQA and DIFF_P where output of the agent include autodriller system parameters (e.g., ROP, WOB, TQA, and DIFF_P set point values, as well as appropriate controller gains).

As explained, an agent can be a machine learning model that is trained via reinforcement learning in a manner such that the trained agent can set parameters that maximize an appropriate reward function. As an example, an agent may receive one or more reference values (e.g., for ROP, WOB, TQA, DIFF_P set points, etc.) from an autodriller system (e.g., "AutoROP" system). In various instances, such values may be provided as "hints", limits, for comparisons, etc.

As explained, training of an agent can involve use of a digital avatar that represents one or more features of a system that can include definable states (e.g., be defined by state information). A digital avatar, or simply avatar, can include or represent autodriller system logic and represent a "plant", which is a model or models of a physical response of a drilling system.

In various examples, a plant may be modeled using a trained neural network. For example, consider a neural network that can receive contextual information as well as equipment information such as, for example, drawworks speed set point (e.g., as may be output from an autodriller system) as inputs and that can then output various drilling-related quantities that define a state of drilling behavior (e.g., consider output as to values of ROP, WOB, TQA, DIFF_P, hole depth (HD), hookload (HKLD), etc.). In turn, such values can be ingested by an agent and used in its computations (e.g., for purposes of training the agent).

As an example, a rate of penetration drilling parameter value can be a controller parameter value for at least one of proportional control and integral control. For example, consider a controller parameter value that corresponds to a control loop for at least one of weight on bit (WOB), torque (TQA), and differential pressure (DIFF_P). As explained, a controller can include multiple control loops, where, for example, each of the multiple control loops corresponds to a particular parameter. As an example, each of multiple control loops may be the same as one or more others or differ from one or more others. For example, consider choices from amongst proportional (P), integral (I) and derivative (D) control schemes (e.g., one or more of PID control).

A PID controller can use one or more of three control terms of proportional, integral and derivative influence on controller output in an effort to apply accurate and optimal control. A PID controller can operate to calculate an error value as the difference between a desired set point and a measured process variable and can apply an adjustment based on one or more of proportional, integral, and derivative terms. A PID controller can act in an effort that aims to minimize error over time by adjustment of a control variable (e.g., a control parameter, etc.). For example, consider adjusting a fluid control valve by setting it to a new opening value as may be determined by a weighted sum of control terms (e.g., where two or more of P, I and D are implemented or otherwise relevant and contributing to control determinations, etc.).

As explained, a method can include training a neural network to generate a trained neural network. In such an example, training can include utilizing a trained digital avatar to train the neural network as an agent. For example, consider a training scheme that utilizes reinforcement learning and a reward function. In various examples, a reward function or reward functions may be formulated to rank or emphasize particular behavior or behaviors. As explained, during drilling operations, priorities may change. In various instances, an agent may be trained to adapt to changing conditions (e.g., via one or more reward terms, reward functions, etc.) where such changing conditions may give rise to a priority change.

As mentioned, a reward function can include a plurality of terms. For example, consider one or more of a weight on bit (WOB) term, a torque (TQA) term and a differential pressure (DIFF_P) term. Such terms may include associated factors, coefficients, etc., and may be arranged as appropriate, etc. As an example, a reward function may be representable in a multidimensional space or a plurality of one or more dimensional spaces.

As an example, a method can include training a neural network to generate a trained digital avatar, where the neural network includes a deep Kalman filter (e.g., a neural network model of at least a Kalman filter structure, etc.).

As an example, a trained digital avatar can include a trained neural network that includes at least one convolutional neural network (CNN) and at least one long short-term memory component (LSTM).

As an example, a trained digital avatar can include one or more heads for input. For example, consider a trained digital avatar that includes at least two heads for input. In such an example, the at least two heads can include a state head for input of state information and a control head for input of control information.

As an example, a method can include training to generate a trained digital avatar where such training includes feeding output of multiple heads of a neural network to one or more long short-term memory components (LSTM).

As an example, a system can include a processor; memory accessible to the processor; processor-executable instructions stored in the memory and executable by the processor to instruct the system to: receive sensor data; determine a rate of penetration drilling parameter value using a trained neural network and at least a portion of the sensor data; and issue a control instruction for drilling a borehole using the determined rate of penetration drilling parameter value.

As explained, such a system may be operatively coupled to or may include one or more features of an autodriller system such as, for example, an AutoROP system. As an example, a system may output various values that can be issued to an autodriller system and/or that can be rendered to a display. As an example, a system may facilitate automated operation of an autodriller system or may provide recommendations that facilitate operation of an autodriller system such that more and/or lengthier periods of automated operation of the autodriller system provide control of drilling operations that achieve desirable behavior of equipment interacting with an environment (e.g., drilling of a borehole for a well, etc.). As an example, an autodriller system can include an agent as a computational component that is part of the autodriller system where the agent can be a trained agent, which may be selectable from a plurality of trained agents, optionally responsive to conditions, equipment, environment, etc. As an example, consider a model of an environment that includes layers of rock where a trained agent may be available for each of the layers of rock. During drilling operations, a system may select a trained agent from a plurality of trained agents responsive to a transition from an Nth layer of rock to an N+1th layer of rock where the selected trained agent facilitates operation of an autodriller system (e.g., as to ROP) for drilling in the N+1th layer of rock.

As an example, one or more computer-readable storage media can include computer-executable instructions executable to instruct a computing system to: receive sensor data; determine a rate of penetration drilling parameter value using a trained neural network and at least a portion of the sensor data; and issue a control instruction for drilling a borehole using the determined rate of penetration drilling parameter value.

As an example, a computer program product can include executable instructions that can be executed to cause a system to operate according to one or more methods. For example, consider a computer program product that can include instructions executable to instruct a computing system to: receive sensor data; determine a rate of penetration drilling parameter value using a trained neural network and at least a portion of the sensor data; and issue a control instruction for drilling a borehole using the determined rate of penetration drilling parameter value.

Figure 28:
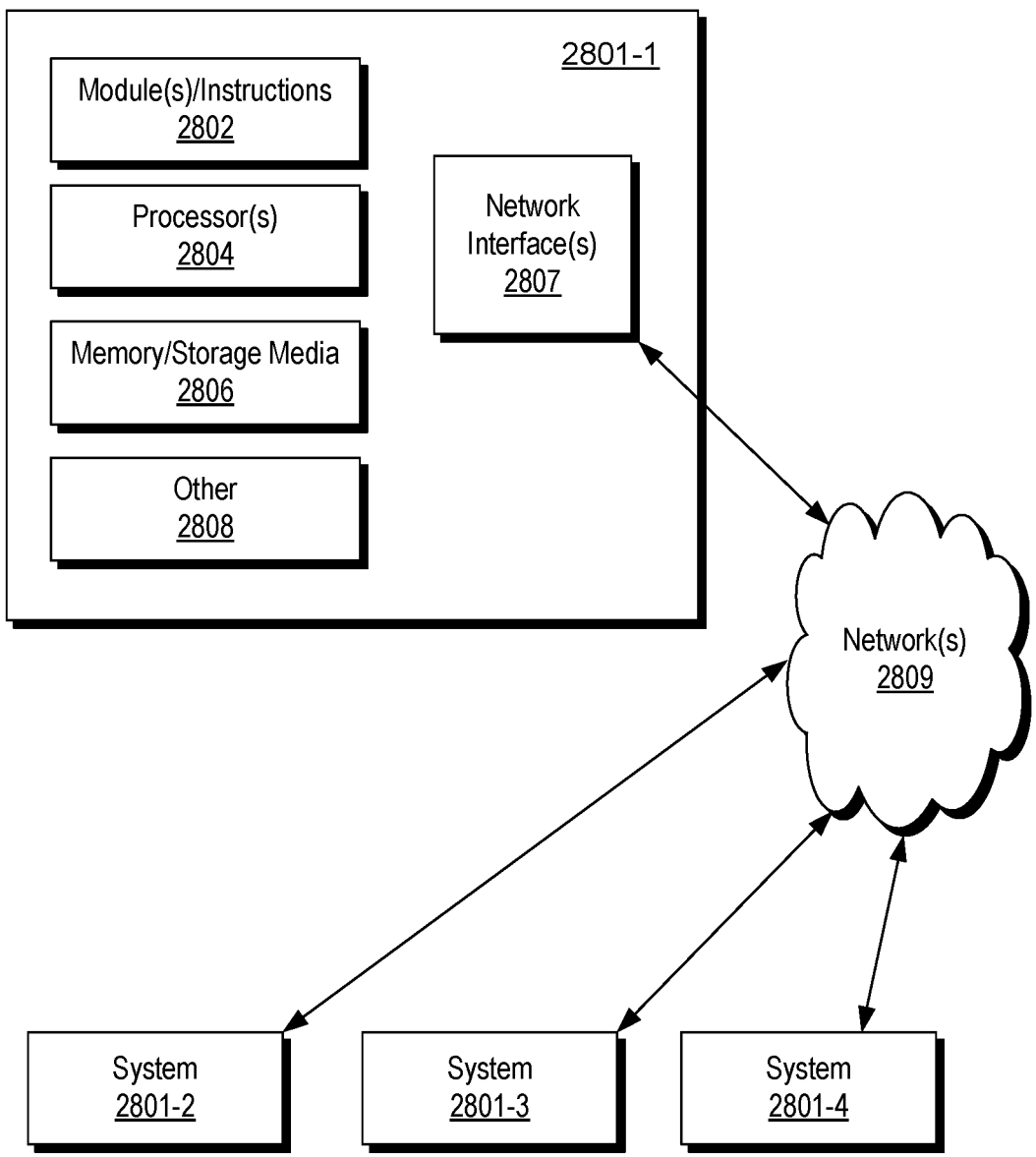
FIG. 28 illustrates an example of a computing system.

In some embodiments, a method or methods may be executed by a computing system. FIG. 28 shows an example of a system 2800 that can include one or more computing systems 2801-1, 2801-2, 2801-3 and 2801-4, which may be operatively coupled via one or more networks 2809, which may include wired and/or wireless networks.

As an example, a system can include an individual computer system or an arrangement of distributed computer systems. In the example of FIG. 28, the computer system 2801-1 can include one or more modules 2802, which may be or include processor-executable instructions, for example, executable to perform various tasks (e.g., receiving information, requesting information, processing information, simulation, outputting information, etc.).

As an example, a module may be executed independently, or in coordination with, one or more processors 2804, which is (or are) operatively coupled to one or more storage media 2806 (e.g., via wire, wirelessly, etc.). As an example, one or more of the one or more processors 2804 can be operatively coupled to at least one of one or more network interface 2807. In such an example, the computer system 2801-1 can transmit and/or receive information, for example, via the one or more networks 2809 (e.g., consider one or more of the Internet, a private network, a cellular network, a satellite network, etc.).

As an example, the computer system 2801-1 may receive from and/or transmit information to one or more other devices, which may be or include, for example, one or more of the computer systems 2801-2, etc. A device may be located in a physical location that differs from that of the computer system 2801-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2806 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components 2808 of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 29:
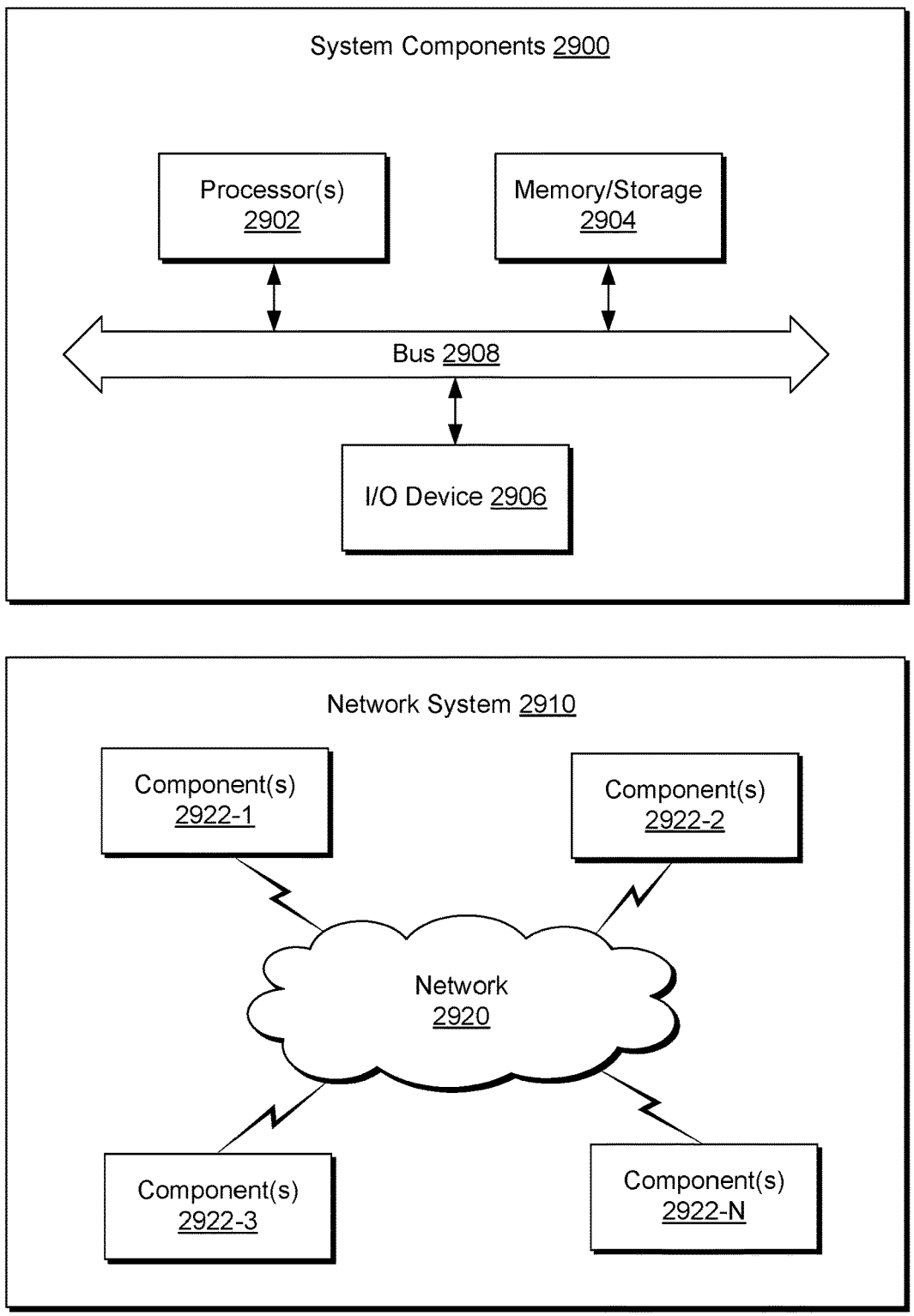
FIG. 29 illustrates example components of a system and a networked system.

FIG. 29 shows components of a computing system 2900 and a networked system 2910 with a network 2920. The system 2900 includes one or more processors 2902, memory and/or storage components 2904, one or more input and/or output devices 2906 and a bus 2908. According to an embodiment, instructions may be stored in one or more computer-readable media (e.g., memory/storage components 2904). Such instructions may be read by one or more processors (e.g., the processor(s) 2902) via a communication bus (e.g., the bus 2908), which may be wired or wireless. The one or more processors may execute such instructions to implement (wholly or in part) one or more attributes (e.g., as part of a method). A user may view output from and interact with a process via an I/O device (e.g., the device 2906). According to an embodiment, a computer-readable medium may be a storage component such as a physical memory storage device, for example, a chip, a chip on a package, a memory card, etc.

According to an embodiment, components may be distributed, such as in the network system 2910. The network system 2910 includes components 2922-1, 2922-2, 2922-3, . . . 2922-N. For example, the components 2922-1 may include the processor(s) 2902 while the component(s) 2922-3 may include memory accessible by the processor(s) 2902. Further, the component(s) 2922-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
    receiving sensor data;
    performing training to generate a trained neural network, wherein the training comprises utilizing a trained digital avatar to train the neural network as an agent;
    determining a rate of penetration drilling parameter value using the trained neural network and at least a portion of the sensor data, wherein the rate of penetration drilling parameter value comprises a set point value, and wherein the trained neural network is trained using a reward function that comprises a plurality of terms; and
    issuing a control instruction for drilling a borehole using the determined rate of penetration drilling parameter value.

2. The method of claim 1, wherein the set point value comprises a weight on bit value.

3. The method of claim 1, wherein the set point value comprises a torque value.

4. The method of claim 1, wherein the set point value comprises a pressure value.

5. The method of claim 1, wherein the set point value is a set point for at least one of proportional control and integral control.

6. The method of claim 5, wherein the set point value corresponds to a control loop for at least one of weight on bit, torque, and differential pressure.

7. The method of claim 1, comprising training another neural network to generate the trained digital avatar, wherein the another neural network comprises a deep Kalman filter.

8. The method of claim 7, wherein the training to generate the trained digital avatar comprises feeding output of multiple heads of the another neural network to one or more long short-term memory components.

9. The method of claim 1, wherein the trained digital avatar comprises another trained neural network that comprises at least one convolution neural network and at least one long short-term memory component.

10. The method of claim 1, wherein the trained digital avatar comprises at least two heads for input.

11. The method of claim 10, wherein the at least two heads comprise a state head for input of state information and a control head for input of control information.

12. The method of claim 1, wherein the issuing the control instruction for drilling a borehole using the determined rate of penetration drilling parameter value comprises issuing the control instruction to an autodriller controller that controls a drawworks based on the set point value.

13. A system comprising:
    a processor;
    memory accessible to the processor;
    processor-executable instructions stored in the memory and executable by the processor to instruct the system to:
        receive sensor data;
        perform training to generate a trained neural network, wherein the training comprises utilizing a trained digital avatar to train the neural network as an agent;
        determine a rate of penetration drilling parameter value using the trained neural network and at least a portion of the sensor data, wherein the rate of penetration drilling parameter value comprises a set point value, and wherein the trained neural network is trained using a reward function that comprises a plurality of terms; and
        issue a control instruction for drilling a borehole using the determined rate of penetration drilling parameter value.

14. One or more non-transitory computer-readable storage media comprising computer-executable instructions executable to instruct a computing system to:
    receive sensor data;
    perform training to generate a trained neural network, wherein the training comprises utilizing a trained digital avatar to train the neural network as an agent;
    determine a rate of penetration drilling parameter value using the trained neural network and at least a portion of the sensor data, wherein the rate of penetration drilling parameter value comprises a set point value, and wherein the trained neural network is trained using a reward function that comprises a plurality of terms; and issue a control instruction for drilling a borehole using the determined rate of penetration drilling parameter value.

* * * * *